United States Patent
Bohdan et al.

(10) Patent No.: US 10,146,507 B2
(45) Date of Patent: Dec. 4, 2018

(54) RANDOMNESS TEST APPARATUS AND METHOD FOR RANDOM NUMBER GENERATOR

(71) Applicant: SAMSUNG ELECTRONICS CO., LTD., Suwon-si (KR)

(72) Inventors: Karpinskyy Bohdan, Suwon-si (KR); Yong-ki Lee, Yongin-si (KR); Mi-jung Noh, Yongin-si (KR); Sang-wook Park, Hwaseong-si (KR); Kitak Kim, Yongin-si (KR); Yong-Soo Kim, Osan-si (KR); Yun-hyeok Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/404,826

(22) Filed: Jan. 12, 2017

(65) Prior Publication Data

US 2018/0136907 A1    May 17, 2018

(30) Foreign Application Priority Data

Nov. 16, 2016  (KR) ........................ 10-2016-0152968

(51) Int. Cl.
*G06F 7/58* (2006.01)
(52) U.S. Cl.
CPC ................ *G06F 7/584* (2013.01); *G06F 7/58* (2013.01)
(58) Field of Classification Search
None
See application file for complete search history.

(56) References Cited

U.S. PATENT DOCUMENTS

| | | |
|---|---|---|
| 6,675,113 B2 | 1/2004 | Hars |
| 6,947,960 B2 | 9/2005 | Hars |
| 6,993,543 B2 | 1/2006 | Hars |
| 7,031,991 B2 | 4/2006 | Hars |
| 7,295,674 B2 | 11/2007 | Hars |
| 7,653,855 B2 | 1/2010 | Yasuda et al. |
| 7,788,479 B2 | 8/2010 | Ishii |
| 7,917,560 B2 | 3/2011 | Matsumoto et al. |
| 8,200,727 B2 | 6/2012 | Betouin et al. |
| 8,364,735 B2 | 1/2013 | Nakakita |
| 8,676,870 B2 | 3/2014 | Matthews, Jr. et al. |

(Continued)

FOREIGN PATENT DOCUMENTS

| | | |
|---|---|---|
| JP | 2008-242815 A | 10/2008 |
| KR | 10-1583471 B1 | 1/2016 |

*Primary Examiner* — David H Malzahn
(74) *Attorney, Agent, or Firm* — Sughrue Mion, PLLC

(57) ABSTRACT

An apparatus for testing a random number generator includes a correlation test circuit and a randomness determination circuit. The correlation test circuit extracts a first plurality of bit pairs each including two bits spaced apart from each other by a first distance in a bit stream generated by the random number generator, obtains a first sum of differences between respective two bits of the first plurality of bit pairs, and obtains a second sum of differences between respective two bits of a second plurality of bit pairs, the second plurality of bit pairs each including two bits spaced apart from each other by a second distance, different from the first distance, in the bit stream. The randomness determination circuit determines a randomness of the bit stream, based on the first sum and the second sum.

20 Claims, 20 Drawing Sheets

(56) References Cited

U.S. PATENT DOCUMENTS

| | | |
|---|---|---|
| 8,805,905 B2 | 8/2014 | Hars |
| 8,868,630 B1 * | 10/2014 | Boppana ................. G06F 7/582 |
| | | 708/250 |
| 2003/0158876 A1 | 8/2003 | Hars |
| 2003/0187889 A1 | 10/2003 | Hars |
| 2007/0244951 A1 * | 10/2007 | Gressel ................... G06F 7/582 |
| | | 708/252 |
| 2009/0037787 A1 * | 2/2009 | Vasyltsov ............ G07C 15/006 |
| | | 714/739 |
| 2014/0201252 A1 * | 7/2014 | Brocker ............. G06F 11/2205 |
| | | 708/250 |
| 2014/0279813 A1 | 9/2014 | Vasyltsov |
| 2015/0149519 A1 * | 5/2015 | Kokubo .................... G06F 7/58 |
| | | 708/250 |
| 2015/0199175 A1 * | 7/2015 | Wang ....................... G06F 7/58 |
| | | 708/250 |
| 2015/0227344 A1 | 8/2015 | Park et al. |
| 2018/0136907 A1 * | 5/2018 | Bohdan ..................... G06F 7/58 |

* cited by examiner

RANDOMNESS TEST APPARATUS AND METHOD FOR RANDOM NUMBER GENERATOR

CROSS-REFERENCE TO RELATED APPLICATION

This application claims priority from Korean Patent Application No. 10-2016-0152968, filed on Nov. 16, 2016, in the Korean Intellectual Property Office, the disclosure of which is incorporated herein in its entirety by reference.

BACKGROUND

Apparatuses and methods consistent with exemplary embodiments relate to generation of a random number, and more particularly, to an apparatus and a method of testing randomness of a random number generated by a random number generator.

Random number generators may be applied to various applications using an unpredictable result such as statistical sampling, computer simulations, and cryptography. Particularly, applications that use high unpredictability such as security applications need high randomness of the random number generators, and when the randomness of a random number generated by a random number generator is insufficient, low security is provided. Therefore, it is desirable to easily and accurately determine whether a random number generated by a random number generator has sufficient randomness at low cost.

SUMMARY

One or more exemplary embodiments provide an apparatus and a method of testing a random number generator, and particularly, provide an apparatus and a method of testing randomness of a random number generated by a random number generator.

According to an aspect of an exemplary embodiment, there is provided an apparatus for testing a random number generator including a correlation test circuit configured to extract a first plurality of bit pairs each including two bits spaced apart from each other by a first distance in a bit stream generated by the random number generator, obtain a first sum of differences between respective two bits of the first plurality of bit pairs, and obtain a second sum of differences between respective two bits of a second plurality of bit pairs, the second plurality of bit pairs each including two bits spaced apart from each other by a second distance, different from the first distance, in the bit stream; and a randomness determination circuit configured to determine a randomness of the bit stream, based on the first sum and the second sum.

According to an aspect of another exemplary embodiment, there is provided an apparatus for testing a random number generator including an M-bit shift register configured to sequentially receive N-bits generated by the random number generator; a difference operation circuit configured to obtain a difference between two bits of each of K number of different bit pairs in an M-bit sequence output from the M-bit shift register; K number of accumulators respectively connected to bits of a K-bit output of the difference operation circuit; and a randomness determination circuit configured to determine a randomness of the N-bits, based on outputs of the K number of accumulator, wherein each of 'K', 'M', and 'N' is an integer equal to or greater than two.

According to an aspect of still another exemplary embodiment, there is provided a method of testing a random number generator including obtaining a difference between two bits of each of K number of different bit pairs in a bit sequence including continuous M-bits, the M-bits being among N-bits generated by the random number generator; accumulating K number of differences respectively corresponding to the K number of different bit pairs in a plurality of different bit sequences; and determining a randomness of the N-bits, based on accumulated K number of differences, wherein each of 'K', 'M', and 'N' is an integer equal to or greater than two.

According to an aspect of still another exemplary embodiment, there is provided an apparatus for controlling a random number generator including the random number generator configured to generate a bit stream; a randomness test apparatus configured to obtain a difference between bit values of two bits of each of a first plurality of bit pairs having different widths in a bit sequence included in the bit stream, obtain accumulated differences corresponding to the different widths in a plurality of different bit sequences obtained by shifting the bit stream, and configured to generate an output signal based on a variation in the accumulated differences; and a controller configured to control the random number generator based on the output signal of the randomness test apparatus.

According to an aspect of still another exemplary embodiment, there is provided an apparatus for testing a random number, the apparatus including a variation detector configured to detect a variation in a difference between bit values of two bits of each of a first plurality of bit pairs having different widths in a continuous bit sequence, the continuous bit sequence corresponding to at least a portion of serial random numbers; and a comparator configured to compare the variation with a reference value to determine randomness of the serial random numbers.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
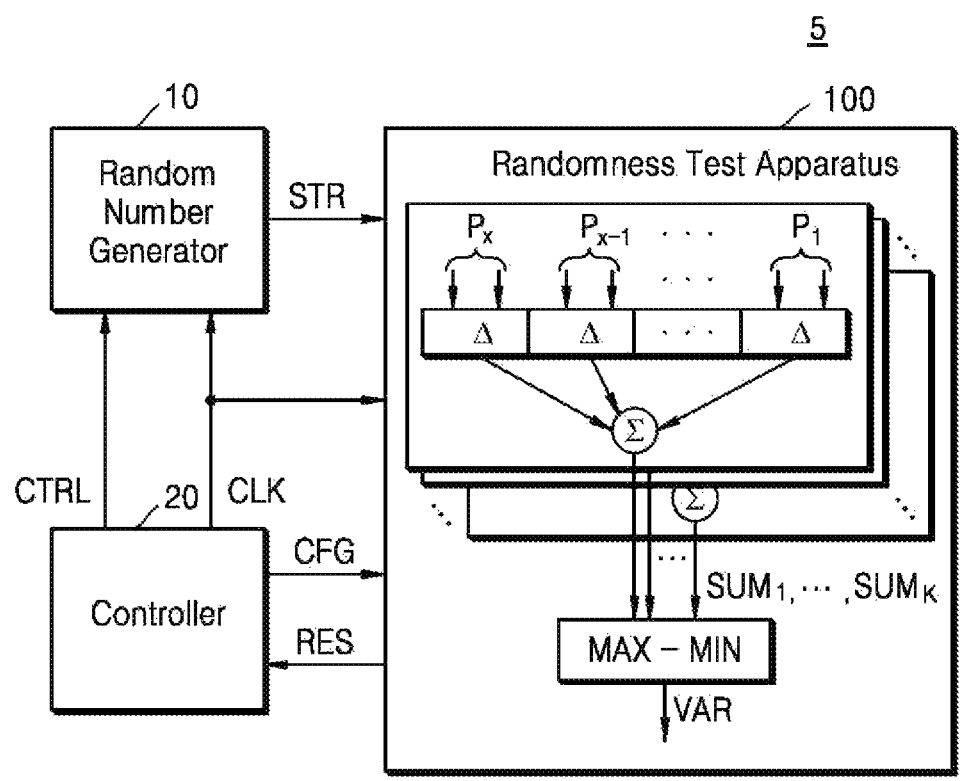
FIG. 1 is a block diagram of a system including a randomness test apparatus according to an exemplary embodiment.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

Figure 2:
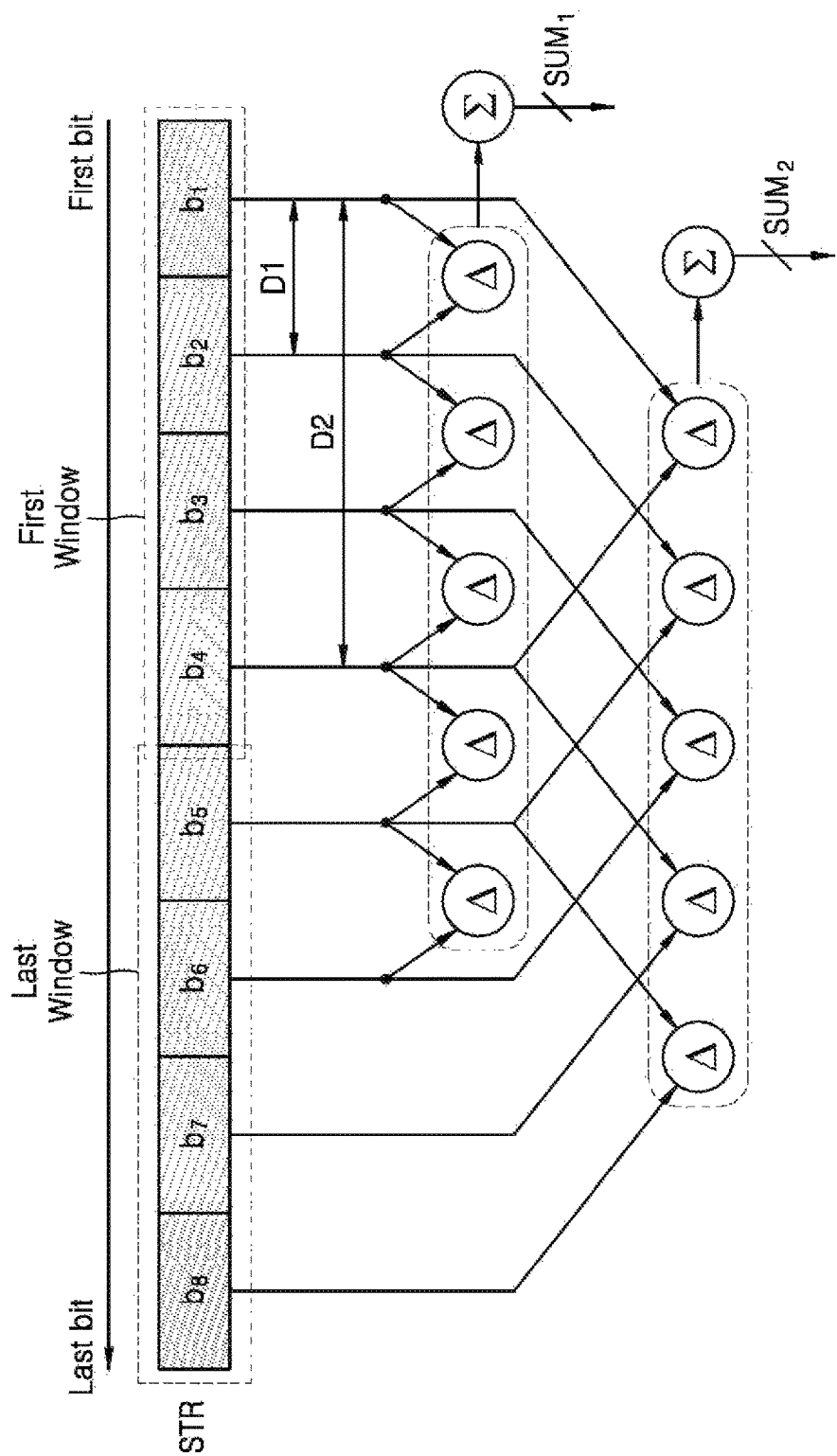
FIG. 2 illustrates an example of an operation of the randomness test apparatus of FIG. 1 according to an exemplary embodiment.

FIG. 1 is a block diagram of a system (or apparatus) 5 including a randomness test apparatus 100 according to an exemplary embodiment, and FIG. 2 illustrates an example of an operation of the randomness test apparatus 100 of FIG. 1 according to an exemplary embodiment.

Referring to FIG. 1, the system 5 may include a random number generator 10, a controller 20, and the randomness test apparatus 100. The system 5 may include an integrated circuit (IC) into which the random number generator 10, the controller 20, and the randomness test apparatus 100 are all integrated and which is manufactured through a semiconductor process. The randomness test apparatus 100 may be added into the system 5 and may be detachably attached to the random number generator 10 and/or the controller 20. Although not shown in FIG. 1, the system 5 may further include a function block that receives a bit stream STR generated by the random number generator 10 and performs an operation by using the bit stream STR.

In response to a control signal CTRL and a clock signal CLK received from the controller 20, the random number generator 10 may generate the bit stream STR so that each of bits has a value '0' or '1' in an irregular pattern. For example, the random number generator 10 may start or stop generation of the bit stream STR according to the control signal CTRL. Also, the random number generator 10 may generate the bit stream STR so that the bits of the bit stream STR are synchronized with the clock signal CLK.

The random number generator 10 may be implemented in various methods. For example, the random number generator 10 may include a ring oscillator. The random number generator 10 may sample a jitter of an oscillating signal generated by the ring oscillator according to the clock signal CLK to generate the bit stream STR.

The controller 20 may generate the control signal CTRL to control the random number generator 10 and may generate the clock signal CLK to supply the clock signal CLK to the random number generator 10. The controller 20 may initialize the random number generator 10 or may restart or stop an operation of the random number generator 10, by using the control signal CTRL. For example, the controller 20 may receive a result signal RES, indicating information about the randomness of the random number generator 10, from the randomness test apparatus 100 and may generate the control signal CTRL and/or the clock signal CLK to be supplied to the random number generator 10, based on the result signal RES. That is, in response to the result signal RES indicating the insufficiency of randomness of the random number generator 10, the controller 20 may generate the control signal CTRL and/or the clock signal CLK to initialize the random number generator 10 or change the operation of the random number generator 10.

The controller 20 may supply a setting signal CFG to the randomness test apparatus 100. For example, as illustrated in FIG. 1, the controller 20 may generate the setting signal CFG to set the randomness test apparatus 100, based on a characteristic of the random number generator 10, and may provide the setting signal CFG to the randomness test apparatus 100. The randomness test apparatus 100 may test the bit stream STR, based on the setting signal CFG. As described later, the controller 20 may set each of reference values (for example, first to fourth reference values of FIG. 16) applied to the randomness test apparatus 100, based on the setting signal CFG. The setting signal CFG may be generated based on a desired entropy of the bit stream STR generated by the random number generator 10. Therefore, the reference values may be determined based on the desired entropy of the bit stream STR generated by the random number generator 10 according to control by the controller 20.

The randomness test apparatus 100 may receive the bit stream STR generated by the random number generator 10 and the clock signal CLK and the setting signal CFG generated by the controller 20 to generate the result signal RES and may provide the result signal RES to the controller 20. As described above, the result signal RES may indicate information about the randomness of the bit stream STR. For example, an activated result signal RES may indicate PASS that denotes the bit stream STR being random (or sufficiently random), and a deactivated result signal RES may indicate FAIL that denotes the bit stream STR being non-random (or not sufficiently random).

According to an exemplary embodiment, the randomness test apparatus 100 may extract a plurality of bit pairs (for example, $P_X, P_{X-1}, \ldots, P_1$) having the same width in the bit stream STR. The width of each of the bit pairs may denote a distance between two bits of a corresponding bit pair in the bit stream STR, and the plurality of bit pairs (for example, $P_X$, $P_{X-1}$, ..., and $P_1$) having the same width may be extracted (e.g., including two bits which are spaced apart from each other by the same distance). The randomness test apparatus 100 may summate differences between two bits of the respective bit pairs (for example, $P_X$, $P_{X-1}$, ..., and $P_1$) to generate a sum thereof (for example, $SUM_1$). In this manner, the randomness test apparatus 100 may generate a plurality of sums $SUM_1$, $SUM_2$, ..., and $SUM_K$ respectively corresponding to a plurality of different widths in the bit stream STR and may determine the randomness of the bit stream STR, based on the plurality of sums $SUM_1$, $SUM_2$, ..., $SUM_K$. By using the plurality of sums $SUM_1$, $SUM_2$, ..., and $SUM_K$, the randomness of the bit stream STR may be accurately determined based on a relatively small number of resources. An operation of generating, by the randomness test apparatus 100, the plurality of sums $SUM_1$, $SUM_2$, ..., and $SUM_K$ will be described in detail with reference to FIG. 2.

According to an exemplary embodiment, the randomness test apparatus 100 may determine the randomness of the bit stream STR, based on a variation of the plurality of sums $SUM_1$, $SUM_2$, ..., and $SUM_K$. For example, the randomness test apparatus 100 may generate a variation VAR corresponding to a difference between a maximum value MAX and a minimum value MIN of the plurality of sums $SUM_1$, $SUM_2$, ..., and $SUM_K$. By using the variation VAR, the randomness test apparatus 100 may accurately determine the randomness of the bit stream STR. For example, the variation VAR being large may be construed as an entropy being small in the bit stream STR, and thus, the randomness test apparatus 100 may compare the variation VAR with a predetermined reference value to determine the randomness of the bit stream STR.

Referring to FIG. 2, the bit stream STR generated by the random number generator 10 may include eight bits $b_1$ to $b_8$. The eight bits $b_1$ to $b_8$ of the bit stream STR may be sequentially input to the randomness test apparatus 100 in the order of a first bit $b_1$ (or a least significant bit (LSB)) to an eighth bit $b_8$ (or a most significant bit (MSB)). In the example of FIG. 2, the randomness test apparatus 100 may generate two sums $SUM_1$ and $SUM_2$ respectively corresponding to two different widths.

As illustrated in FIG. 2, the randomness test apparatus 100 may summate differences between two bits of a plurality of bit pairs having a first width D1 to generate a first sum $SUM_1$. That is, the randomness test apparatus 100 may extract five bit pairs $<b_1, b_2>$, $<b_2, b_3>$, $<b_3, b_4>$, $<b_4, b_5>$, and $<b_5, b_6>$ where a distance between two bits is 1 (or one bit), and may summate differences between two bits of the five bit pairs $<b_1, b_2>$, $<b_2, b_3>$, $<b_3, b_4>$, $<b_4, b_5>$, and $<b_5, b_6>$ to generate the first sum $SUM_1$. Similarly, the randomness test apparatus 100 may summate differences between two bits of a plurality of bit pairs having a second width D2 to generate a second sum $SUM_2$. That is, the randomness test apparatus 100 may extract five bit pairs $<b_1, b_4>$, $<b_2, b_5>$, $<b_3, b_6>$, $<b_4, b_7>$, and $<b_5, b_8>$ where a distance between two bits is 3 (or three bits), and may summate differences between two bits of the five bit pairs $<b_1, b_4>$, $<b_2, b_5>$, $<b_3, b_6>$, $<b_4, b_7>$, and $<b_5, b_8>$ to generate the second sum $SUM_2$.

Referring to FIG. 2, a bit sequence including bit pairs having different widths may be referred to as a window. For example, as illustrated in FIG. 2, a first window of the bit stream STR may include a bit pair $<b_1, b_2>$ having a first width D1 and a bit pair $<b_1, b_4>$ having a second width D2. Similarly, a second window may include a bit pair $<b_2, b_3>$ having a first width D1 and a bit pair $<b_2, b_5>$ having a second width D2, and as illustrated in FIG. 2, a fifth window may include a bit pair $<b_5, b_6>$ and a bit pair $<b_5, b_8>$. Therefore, in the embodiment of FIG. 2, the number of windows may be five, which may match the number of bit pairs having the same width. The number of windows may be determined based on a length of the bit stream STR and a length of a window, and for example, the number of windows (e.g., '5' in FIG. 2) may be a value obtained by adding one to a difference between the length (e.g., '8' in FIG. 2) of the bit stream STR and the length (e.g., '4' in FIG. 2) of the window. The length (e.g., '4' in FIG. 2) of the window may be determined as a value obtained by adding one to a maximum width (e.g., '3' in FIG. 2) of bit pairs extracted by the randomness test apparatus 100, and thus, the number of bit pairs (e.g., the number of windows) having the same width may also be determined based on a maximum width of bit pairs. That is, when the bit stream STR includes N bits and a length of a window is M, the number of windows may be 'N−M+1', and a maximum width of bit pairs may be limited to 'M−1'. Herein, 'K', 'M', and 'N' may each be an integer equal to or more than two.

Although FIG. 2 illustrates an operation of generating, by the randomness test apparatus 100, the sums $SUM_1$ and $SUM_2$ respectively corresponding to the two different widths D1 and D2, as described below, the randomness test apparatus 100 may generate sums respectively corresponding to three or more different widths. Also, in FIG. 2, the two widths D1 and D2 are merely an example, and it may be understood that bit pairs having widths other than 1 and 3 may be extracted.

Figure 3:
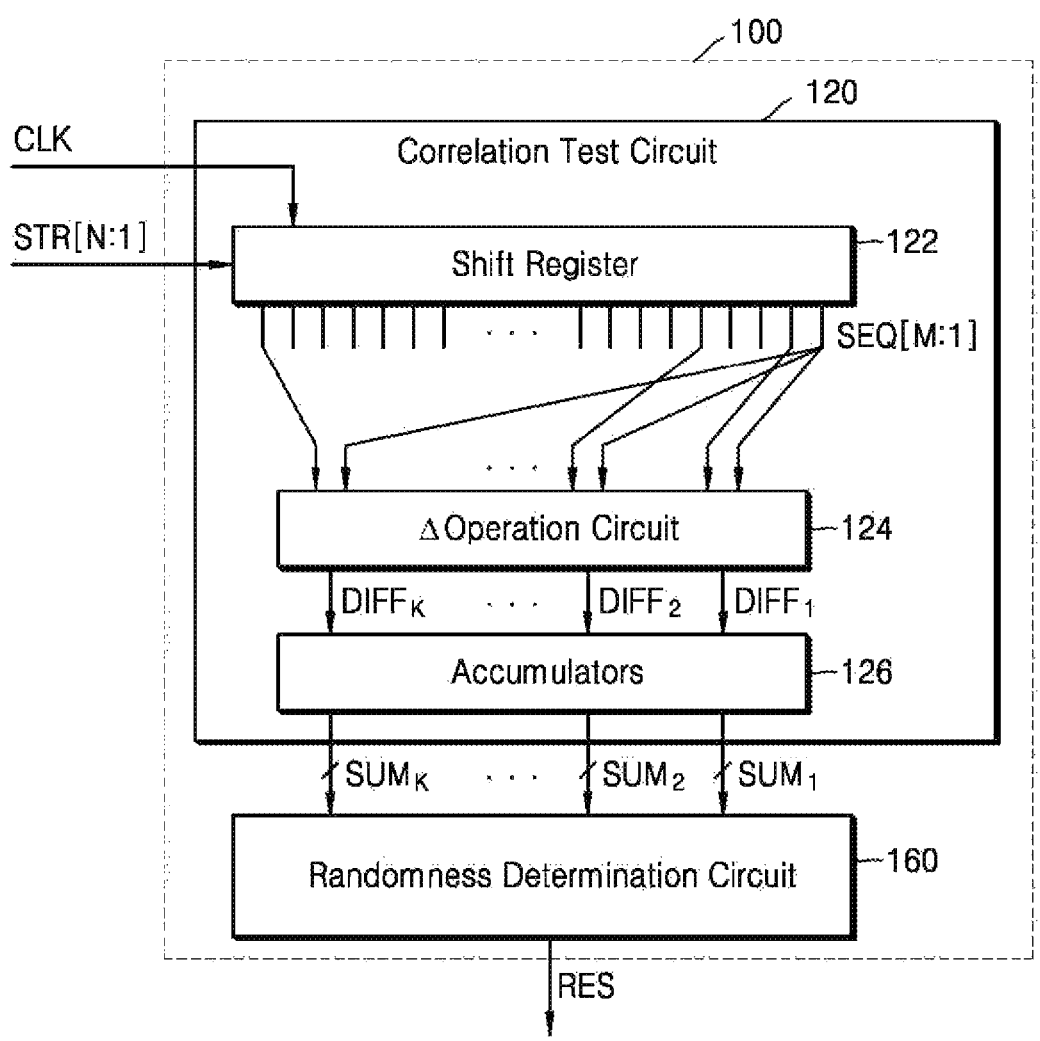
FIG. 3 illustrates a block diagram of the randomness test apparatus of FIG. 1 according to an exemplary embodiment.

FIG. 3 illustrates a block diagram of the randomness test apparatus 100 of FIG. 1 according to an exemplary embodiment.

As described above with reference to FIGS. 1 and 2, the randomness test apparatus 100 may summate differences between two bits of a plurality of bit pairs having the same width extracted from the bit stream STR and may generate a plurality of sums corresponding to a plurality of different widths. FIG. 3 illustrates an example where the bit stream STR includes N bits, a length of a window is M, and bit pairs corresponding to K number of different widths are extracted. As illustrated in FIG. 3, the randomness test apparatus 100 may include a correlation test circuit 120 and a randomness determination circuit 160.

The correlation test circuit 120 may receive the clock signal CLK and the bit stream STR including the N bits to generate K number of sums $SUM_1$, $SUM_2$, ..., and $SUM_K$. As described above with reference to FIG. 1, each of the bits of the bit stream STR may be synchronized with the clock signal CLK by the random number generator 10 of FIG. 1. As illustrated in FIG. 3, the correlation test circuit 120 may include a shift register 122, a difference operation circuit 124, and a plurality of accumulators 126.

The shift register 122 may shift the bit stream STR one by one in synchronization with the clock signal CLK to output a bit sequence SEQ including M bits. That is, in FIG. 3, the shift register 122 may be an M-bit shift register. Referring to FIG. 3 along with FIG. 2, the bit sequence SEQ output from the shift register 122 may correspond to a window. That is, the shift register 122 may sequentially output 'N−K+1' number of different bit sequences SEQ from the bit stream STR in synchronization with the clock signal CLK.

The difference operation circuit 124 may calculate a difference between two bits of each of K number of different bit pairs in the bit sequence SEQ output from the shift register 122 to output K number of differences $DIFF_1$, $DIFF_2$, ..., and $DIFF_K$. For example, the difference operation circuit 124 may perform K number of difference calculation operations in parallel to generate the K differences $DIFF_1$, $DIFF_2$, ..., and $DIFF_K$ and/or may perform a less than K number of difference calculation operations a plurality of times to generate the K differences $DIFF_1$, $DIFF_2$, ..., and $DIFF_K$.

The K number of different bit pairs input to the difference operation circuit 124 may be determined in various manners. For example, as illustrated in FIG. 3, each of the K different bit pairs may include a first bit (or an LSB), namely, 'SEQ[1]', of the bit sequence SEQ. some of the bit pairs illustrated in FIG. 3 are merely an example, and it may be understood that a plurality of bit pairs having different widths may be supplied to the difference operation circuit 124.

The accumulators 126 may accumulate each of the K differences $DIFF_1$, $DIFF_2$, ..., and $DIFF_K$ generated by the difference operation circuit 124 to generate the K number of sums $SUM_1$, $SUM_2$, ..., and $SUM_K$. The accumulators 126 may accumulate each of the K differences $DIFF_1$, $DIFF_2$, ..., and $DIFF_K$ by the number of the bit sequences SEQ output from the shift register 122, and thus, each of the K differences $DIFF_1$, $DIFF_2$, ..., and $DIFF_K$ may denote a value obtained by summating differences between two bits of bit pairs having the same width in the bit stream STR. For example, the accumulators 126 may include K number accumulators which perform K number of accumulating operations in parallel.

The randomness determination circuit 160 may receive the K number of sums $SUM_1$, $SUM_2$, ..., and $SUM_K$ from the correlation test circuit 120 and may output the result signal RES, based on the K number of sums $SUM_1$, $SUM_2$, ..., and $SUM_K$. The result signal RES may indicate the information about the randomness of the bit stream STR. For example, when the bit stream STR is determined as being sufficiently random, the randomness determination circuit 160 may output the activated result signal RES indicating PASS, and when the bit stream STR is determined as not being sufficiently random, the randomness determination circuit 160 may output the deactivated result signal RES indicating FAIL. Details of the randomness determination circuit 160 will be described below with reference to FIG. 5.

Figure 4:
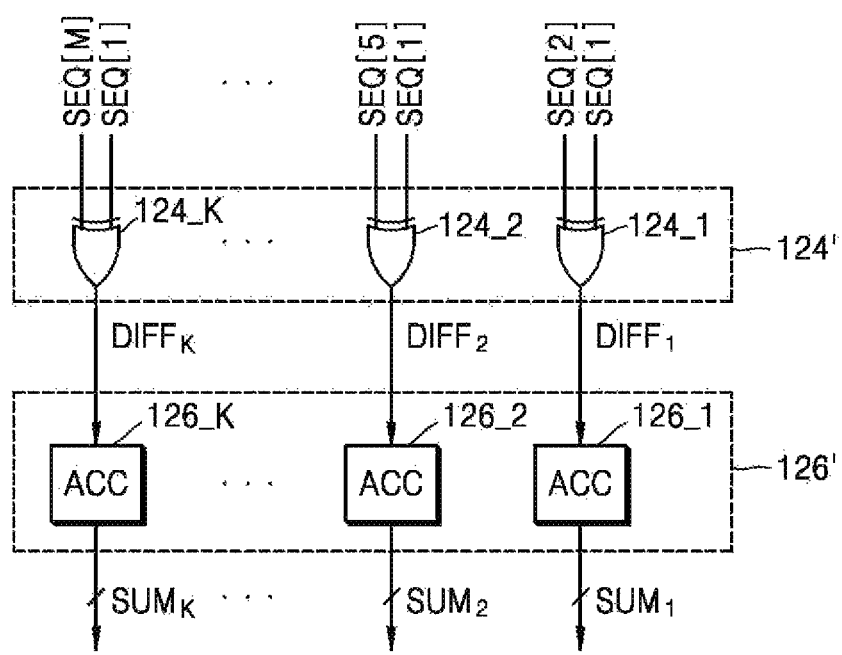
FIG. 4 illustrates an example of a difference operation circuit and accumulators of FIG. 3 according to an exemplary embodiment.

FIG. 4 illustrates examples 124' and 126' of the difference operation circuit 124 and the accumulators 126 of FIG. 3 according to an exemplary embodiment.

As described above with reference to FIG. 3, the difference operation circuit 124' may receive K number of bit pairs in a bit sequence SEQ output from the shift register 122 of FIG. 3 and may perform an arithmetic operation on differences between the K bit pairs to generate K number of differences $DIFF_1$, $DIFF_2$, ..., and $DIFF_K$. According to an exemplary embodiment, as illustrated in FIG. 4, the difference operation circuit 124' may include K number of XOR gates 124_1, 124_2, ... 124_K. The K XOR gates 124_1 to 124_K may respectively receive the K bit pairs to output the K differences $DIFF_1$, $DIFF_2$, ..., and $DIFF_K$. For example, a first XOR gate 124_1 may receive a bit pair <SEQ[1], SEQ[2]> to output a difference $DIFF_1$ between two bits SEQ[1] and SEQ[2]. That is, when all of the two bits SEQ[1] and SEQ[2] are equally '0' or '1', the difference $DIFF_1$ may be '0', and when the two bits SEQ[1] and SEQ[2] differ, the difference $DIFF_1$ may be '1'.

As described above with reference to FIG. 3, the accumulators 126' may accumulate each of the K differences $DIFF_1$, $DIFF_2$, ..., and $DIFF_K$ to generate the K number of sums $SUM_1$, $SUM_2$, ..., and $SUM_K$. According to an exemplary embodiment, as illustrated in FIG. 4, the accumulators 126' may include K number of accumulators 126_1, 126_2, ... 126_K. The K accumulators 126_1 to 126_K may receive each of the K differences $DIFF_1$, $DIFF_2$, ..., and $DIFF_K$ to output the K number of sums $SUM_1$, $SUM_2$, ..., and $SUM_K$. As described above, since the accumulators 126' perform an accumulating operation 'N−M+1' times, each of the K number of sums $SUM_1$, $SUM_2$, ..., and $SUM_K$ may include a more than $\log_2(N-M+1)$' number of bits, and when L is an integer greater than '$\log_2(N-M+1)$', each of the K accumulators 126_1 to 126_K may correspond to an L-bit accumulator.

Figure 5:
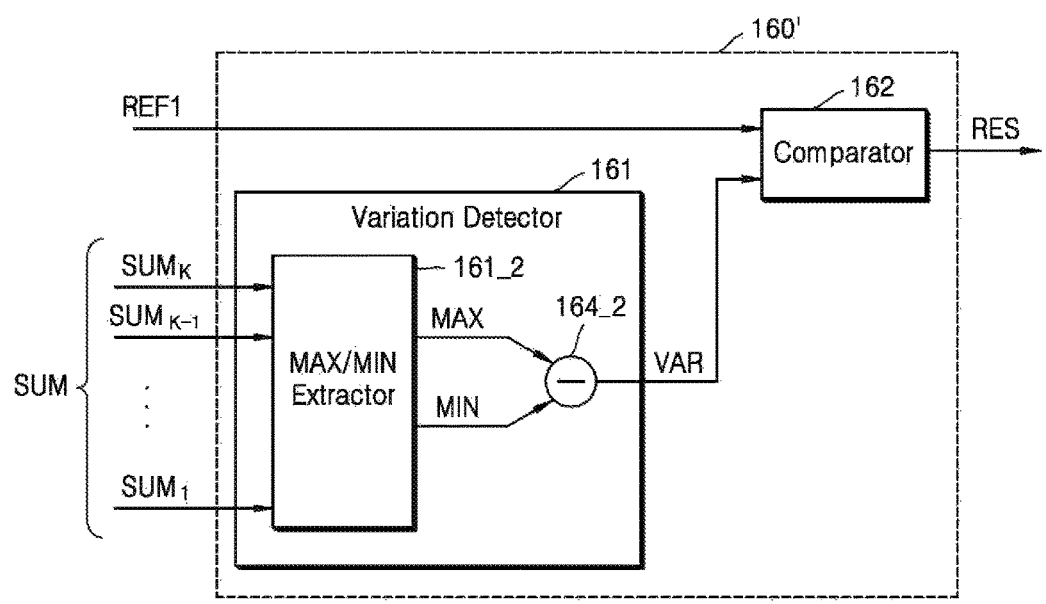
FIG. 5 is a block diagram illustrating an example of a randomness determination circuit of FIG. 3 according to an exemplary embodiment.

FIG. 5 is a block diagram illustrating an example of the randomness determination circuit 160 of FIG. 3 according to an exemplary embodiment.

As described above with reference to FIG. 3, a randomness determination circuit 160' may receive K number of sums $SUM_1$, $SUM_2$, ..., and $SUM_K$ from the correlation test circuit 120 of FIG. 3 and may output a result signal RES, based on the K number of sums $SUM_1$, $SUM_2$, ..., $SUM_{K-1}$ and $SUM_K$. As illustrated in FIG. 5, the randomness determination circuit 160' may include a variation detector 161 and a comparator 162.

The variation detector 161 may detect a variation of the K number of sums $SUM_1$, $SUM_2$, ..., and $SUM_K$ (or SUM) to generate a variation VAR. For example, as illustrated in FIG. 5, the variation detector 161 may include a maximum/minimum extractor 161_2 and a subtractor 164_2. The maximum/minimum extractor 161_2 may extract and output a maximum value MAX and a minimum value MIN from among the K number of sums $SUM_1$, $SUM_2$, ..., and $SUM_K$, and the subtractor 164_2 may subtract the minimum value MIN from the maximum value MAX to generate the variation VAR.

The comparator 162 may compare the variation VAR generated by the variation detector 161 with a first reference value REF1. The first reference value REF1, as illustrated in FIG. 5, may be received from the outside of the randomness determination circuit 160', or unlike the illustration of FIG. 5, may be a value stored in the randomness determination circuit 160'. For example, the first reference value REF1 may be determined based on the setting signal CFG which is supplied to the randomness test apparatus 100 by the controller 20 of FIG. 1. When the variation VAR is less than the first reference value REF1, the comparator 162 may output a deactivated result signal RES, and otherwise, the comparator 162 may output an activated result signal RES. That is, when the variation VAR (e.g., a diffidence between the maximum value MAX and the minimum value MIN) of the K number of sums $SUM_1$, $SUM_2$, ..., and $SUM_K$ is greater than the first reference value REF1, the randomness determination circuit 160' may output the deactivated result signal RES indicating FAIL, and otherwise, the randomness determination circuit 160' may output the activated result signal RES indicating PASS.

As described above, the randomness determination circuit 160' may accurately determine the randomness of the bit stream STR of FIG. 3, based on the variation VAR of the K number of sums $SUM_1$, $SUM_2$, ..., and $SUM_K$ respectively corresponding to K number of different widths. That is, the variation VAR of the K number of sums $SUM_1$, $SUM_2$, ..., and $SUM_K$ being sufficiently large may be construed as an entropy being small in the bit stream STR of FIG. 3. For example, based on a correlation between two bits of each of bit pairs where a width is 4 in the bit stream STR, when a second sum $SUM_2$ output from the second accumulator 126_2 of FIG. 4 is less than first and Kth sums $SUM_1$ and $SUM_K$ respectively output from the first and Kth accumulators 126_1 and 126_K of FIG. 4 and a difference (e.g., the variation VAR) between the maximum value MAX and the minimum value MIN is greater than the first reference value REF1, the bit stream STR may be determined as having low entropy.

Figure 6:
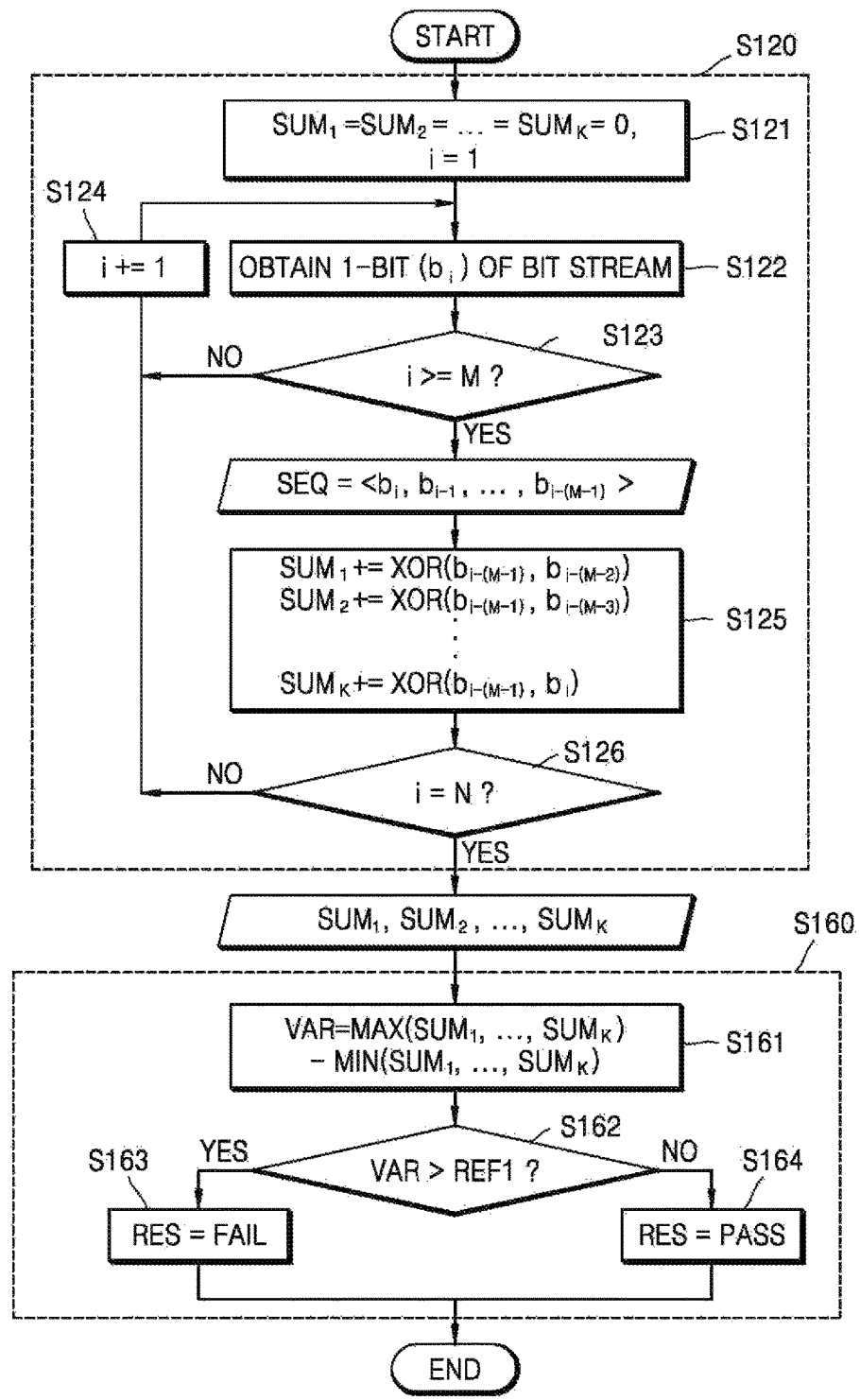
FIG. 6 is a flowchart illustrating an operation of a randomness test apparatus of FIG. 3 according to an exemplary embodiment.

FIG. 6 is a flowchart illustrating an operation of the randomness test apparatus 100 of FIG. 3 according to an exemplary embodiment.

In an exemplary embodiment, operation S120) of FIG. 6 may be performed by the correlation test circuit 120 of FIG. 3, and operation S160 of FIG. 6 may be performed by the randomness determination circuit 160 of FIG. 3. As illustrated in FIG. 6, operation S120 may include a plurality of operations (e.g., S121 to S126), and operation S160 may include a plurality of operations (e.g., S161 to S164). Hereinafter, FIG. 6 will be described with reference to FIG. 3.

In operation S121, an initializing operation may be performed. For example, as illustrated in FIG. 6, an operation of resetting (e.g., setting to 0) K number of sums $SUM_1$, $SUM_2$, ..., and $SUM_K$ and setting a variable 'i' to 1 may be performed.

In operation S122, an operation of obtaining a 1-bit $b_i$ of a bit stream may be performed. For example, the randomness test apparatus 100 may latch the 1-bit $b_i$ of the bit stream STR at every rising (or falling) edge of the clock signal CLK.

In operation S123, an operation of determining whether the variable 'i' is equal to or more than 'M' may be performed. 'M' may be a length of the window of FIG. 2, and whether a first window of the bit stream STR is filled with continuous bits of the bit stream STR may be determined. In other words, 'M' may be the number of bits of the bit sequence SEQ output from the shift register 122 of FIG. 3, and whether the shift register 122 is filled with continuous bits of the bit stream STR may be determined. When the variable 'i' is less than 'M' (e.g., when the first window of FIG. 2 is not filled with the continuous bits of the bit stream STR), an operation of increasing the variable 'i' by one may be performed in operation S124, and an operation of obtaining a new 1-bit of the bit stream STR may be performed in operation S122. On the other hand, when the variable 'i' is equal to or more than 'M', a bit sequence SEQ including M number of bits $b_1, \ldots,$ and $b_{i-(M-1)}$ may be extracted.

In operation S125, an operation of accumulating a difference between two bits of each of K number of bit pairs in the bit sequence SEQ may be performed. For example, as illustrated in FIG. 6, a first sum $SUM_1$ may be updated by accumulating a difference between two bits $(b_{i-(M-1)}, b_{i-(M-2)})$ of a bit pair $<b_{i-(M-1)}, b_{i-(M-2)}>$. In this manner, the K number of sums $SUM_1$, $SUM_2$, ..., and $SUM_K$ may be updated.

In operation S126, an operation of determining whether the variable T matches 'N' may be performed. That is, whether all bits of the bit stream STR are completely obtained may be determined. When the variable 'i' does not match 'N' (e.g., all bits of the bit stream STR are not obtained), an operation of increasing the variable 'i' by one may be performed in operation S124, and then, an operation of obtaining a new 1-bit of the bit stream may be performed in operation S122. On the other hand, when the variable 'i' matches 'N' (e.g., all bits of the bit stream STR are obtained), the K number of sums $SUM_1$, $SUM_2$, ..., and $SUM_K$ may be output.

Subsequently, an operation of subtracting a minimum value of the K number of sums $SUM_1$, $SUM_2$, ..., and $SUM_K$ from a maximum value of the K number of sums $SUM_1$, $SUM_2$, ..., and $SUM_K$ may be performed in operation S161. That is, a difference between the maximum value and the minimum value of the K number of sums $SUM_1$, $SUM_2$, ..., and $SUM_K$ may be generated as a variation VAR.

In operation S162, an operation of comparing the variation VAR with a first reference value REF1 may be performed. When the variation VAR is greater than the first reference value REF1, a result signal RES may indicate FAIL in operation S163. On the other hand, when the variation VAR is equal to or less than the first reference value REF1, the result signal RES may indicate PASS in operation S164.

Figure 7:
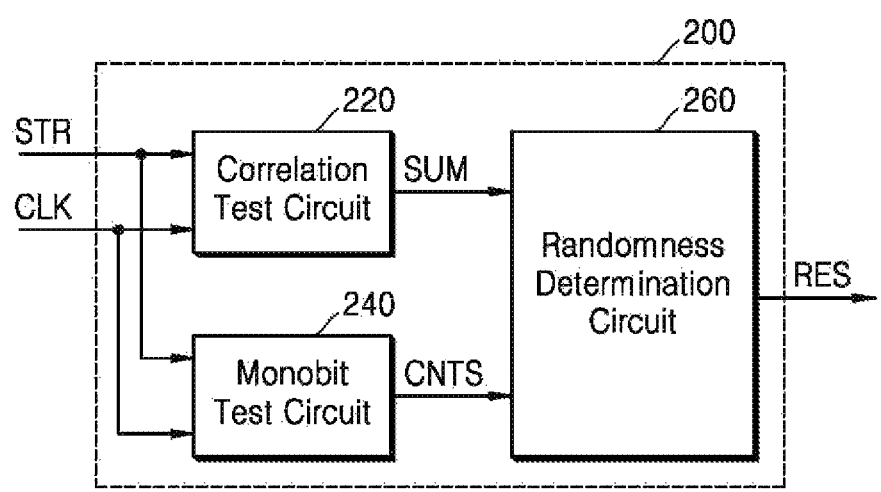
FIG. 7 is a block diagram of a randomness test apparatus according to an exemplary embodiment.

FIG. 7 is a block diagram of a randomness test apparatus 200 according to an exemplary embodiment.

Similarly to the randomness test apparatus 100 of FIG. 1, the randomness test apparatus 200 of FIG. 7 may receive a bit stream STR and a clock signal CLK to output a result signal RES. As illustrated in FIG. 7, the randomness test apparatus 200 may include a correlation test circuit 220, a mono-bit test circuit 240, and a randomness determination circuit 260.

In comparison with the randomness test apparatus 100 of FIG. 3, the randomness test apparatus 200 of FIG. 7 may further include a mono-bit test circuit 240 that generates count signals CNTS. Similarly to the above description made with reference to FIG. 3, the correlation test circuit 220 may generate a plurality of sums SUM from a bit stream STR, and the randomness determination circuit 260 may generate the result signal RES, based on the plurality of sums SUM and the count signals CNTS.

The mono-bit test circuit 240 may count bits having the same bit value in the bit stream STR to generate the count signals CNTS. The randomness determination circuit 260 may detect a ratio of '1' and/or a ratio of '0' in the bit stream STR, based on the count signals CNTS and may determine a randomness of the bit stream STR, based on the detected ratio. Details of the mono-bit test circuit 240 will be described below with reference to FIGS. 8A to 8C, and details of the randomness determination circuit 260 will be described below with reference to FIGS. 9A, 9B, 10A, and 10B.

Figure 8A:
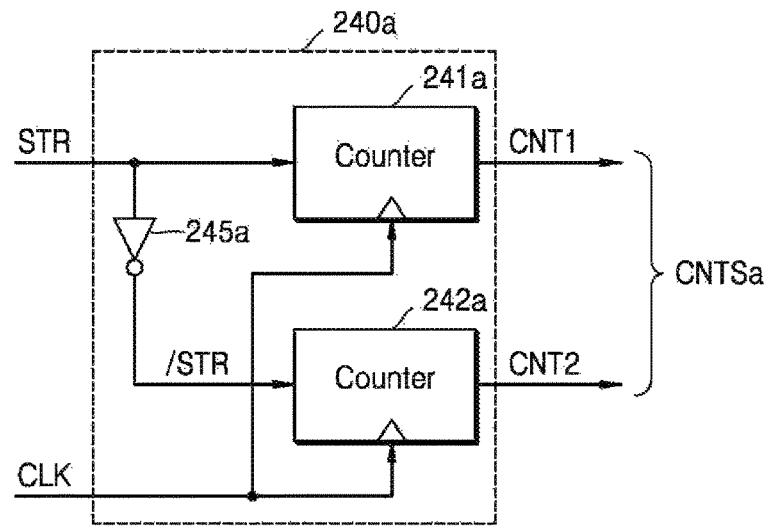
FIGS. 8A to 8C are block diagrams illustrating examples of a mono-bit test circuit of FIG. 7 according to exemplary embodiments.
Figure 8B:
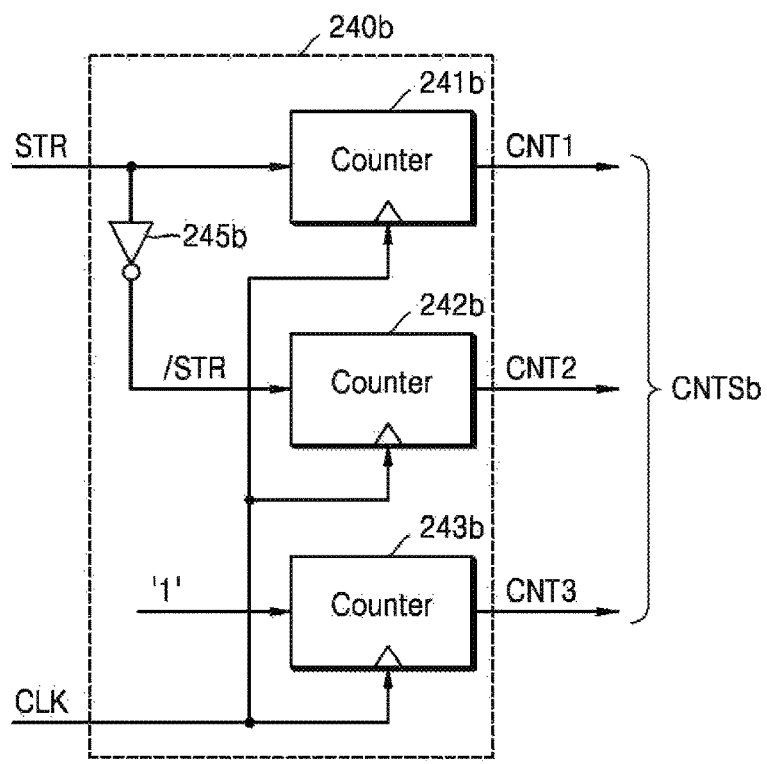
Figure 8C:
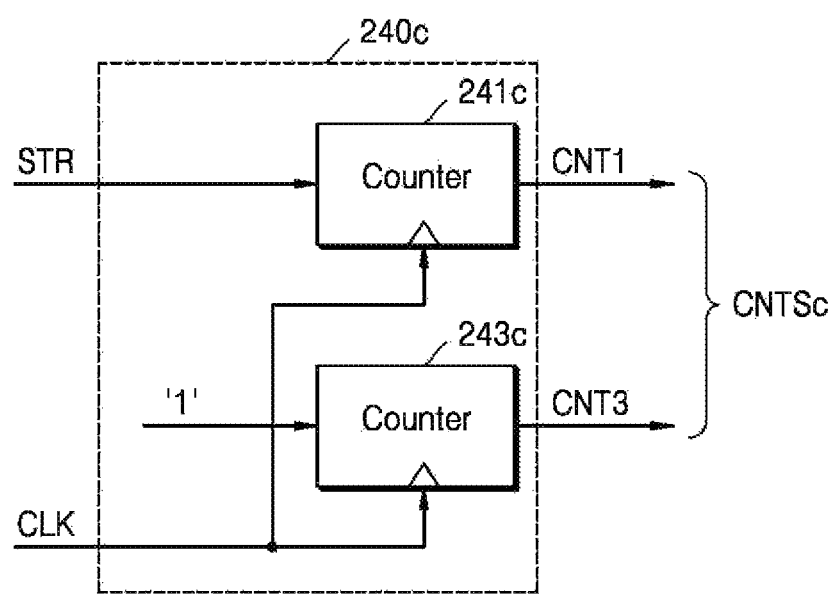

FIGS. 8A to 8C are block diagrams illustrating examples 240a to 240c of the mono-bit test circuit 240 of FIG. 7 according to exemplary embodiments. As described above with reference to FIG. 7, the mono-bit test circuit 240a, 240b, or 240c may count bits having the same bit value in a bit stream STR to generate count signals CNTSa, CNTSb, or CNTSc. As described above with reference to FIG. 1, bits of the bit stream STR may be synchronized with a clock signal CLK, and the mono-bit test circuit 240a, 240b, or 240c may count bits having the same bit value in the bit stream STR in synchronization with the clock signal CLK.

When the number of bits having the same bit value in the bit stream STR is less than a predetermined number (for example, a second reference value REF2 of FIG. 9A), an entropy of the bit stream STR may be construed as being small. Therefore, the mono-bit test circuits 240a to 240c may count the number of bits having the same bit value in the bit stream STR, thereby testing the randomness of the bit stream STR.

Referring to FIG. 8A, the mono-bit test circuit 240a may include a first counter 241a, a second counter 242a, and an inverter 245a. As illustrated in FIG. 8A, the first counter 241a may receive the bit stream STR, and the second counter 242a may receive a bit stream /STR obtained through inversion by the inverter 245a. Therefore, the first counter 241a may count a bit having a bit value '1' in the bit stream STR in synchronization with the clock signal CLK to output a first count signal CNT1. Also, the second counter 242a may count a bit having a bit value '0' in the bit stream STR in synchronization with the clock signal CLK to output a second count signal CNT2. A sum of a value indicated by the first count signal CNT1 output from the first counter 241a and a value indicated by the second count signal CNT2 output from the second counter 242a may match the number of bits of the bit stream STR.

Referring to FIG. 8B, the mono-bit test circuit 240b may include a first counter 241b, a second counter 242b, a third counter 243b, and an inverter 245b. As illustrated in FIG. 8B, the first counter 241b may receive a bit stream STR, the second counter 242b may receive a bit stream /STR obtained through inversion by the inverter 245b, and the third counter 243b may receive '1'. Therefore, the first counter 241b may count a bit having a bit value '1' in the bit stream STR in synchronization with a clock signal CLK to output a first count signal CNT1. Also, the second counter 242b may count a bit having a bit value '0' in the bit stream STR in synchronization with the clock signal CLK to output a second count signal CNT2. The third counter 243b may count bits of the bit stream STR to output a third count signal CNT3. That is, a sum of a value indicated by the first count signal CNT1 output from the first counter 241b and a value indicated by the second count signal CNT2 output from the second counter 242b may match a value indicated by the third count signal CNT3 output from the third counter 243b.

Referring to FIG. 8C, the mono-bit test circuit 240c may include a first counter 241c and a third counter 243c. As illustrated in FIG. 8C, the first counter 241c may receive a bit stream STR, and the third counter 243c may receive '1'. Therefore, the first counter 241c may count a bit having a bit value '1' in the bit stream STR in synchronization with a clock signal CLK to output a first count signal CNT1. Also, the third counter 243c may count bits of the bit stream STR to output a third count signal CNT3. A difference between the third count signal CNT3 output from the third counter 243c and the first count signal CNT1 output from the first counter 241c may match the number of bits having a bit value '0' in the bit stream STR. In an exemplary embodiment, unlike the illustration of FIG. 8C, instead of the first count signal CNT1, the second count signal CNT2 generated by a second counter (for example, 242a in FIG. 8A) which counts the number of bits having a bit value '0' in the bit stream STR may be output along with the third count signal CNT3 indicating the number of bits of the bit stream STR. That is, the first counter 241c that counts a bit having a bit value '1' in the bit stream STR may be replaced with the second counter that counts a bit having a bit value '0' in the bit stream STR.

Figure 9A:
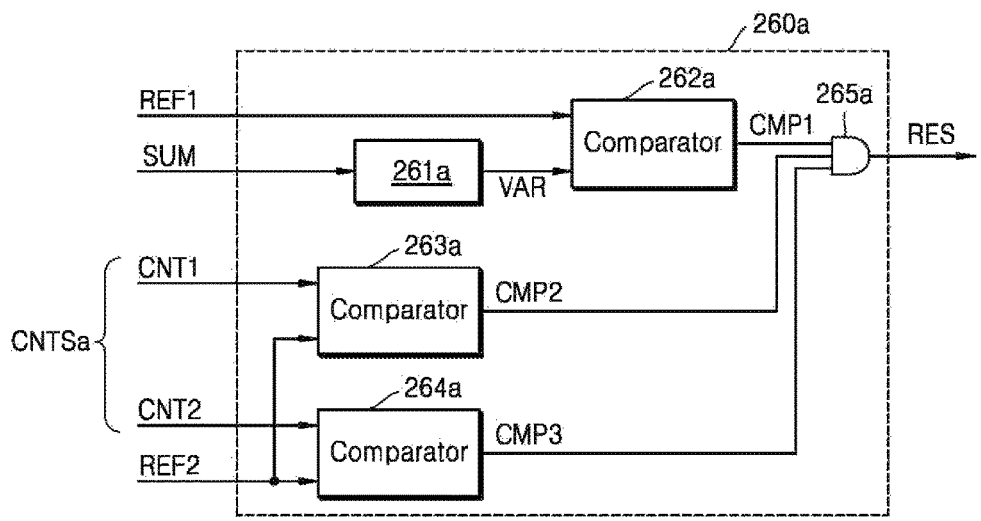
FIGS. 9A and 9B are block diagrams illustrating examples of a randomness determination circuit of FIG. 7 according to exemplary embodiments.
Figure 9B:
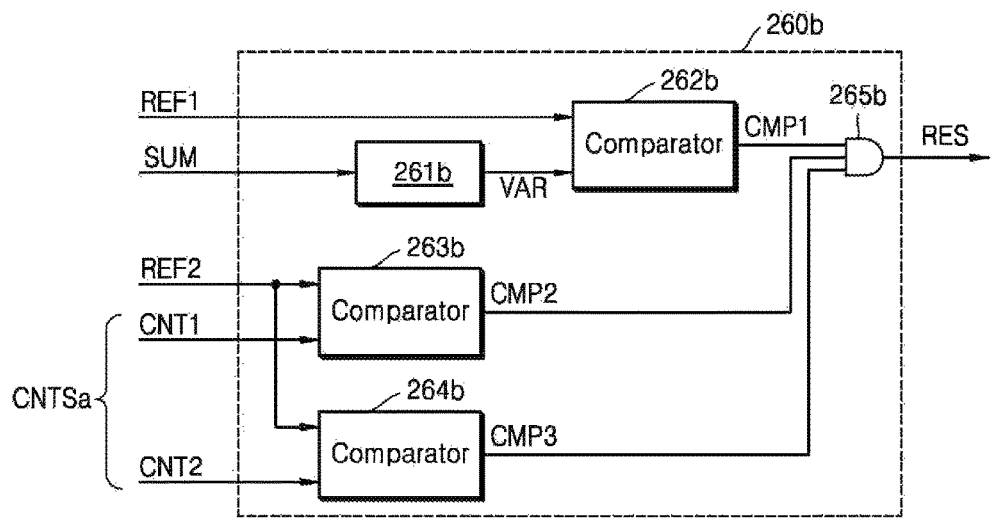

FIGS. 9A and 9B are block diagrams illustrating examples 260a and 260b of the randomness determination circuit 260 of FIG. 7 according to exemplary embodiments.

As described above with reference to FIG. 7, randomness determination circuits 260a and 260b may receive a plurality of sums SUM generated by the correlation test circuit 220 and count signals CNTS generated by the mono-bit test circuit 240 and may generate a result signal RES indicating information about a randomness of the bit stream STR, based on the plurality of sums SUM and the count signals CNTS.

Referring to FIG. 9A, the randomness determination circuit 260a may include a variation detector 261a, a plurality of comparators 262a, 263a, and 264a, and an AND gate 265a. Similarly to the variation detector 161 of FIG. 5, the variation detector 261a may output a variation VAR of the plurality of sums SUM. A first comparator 262a may compare a first reference value REF1 with the variation VAR to generate a first comparison signal CMP1. The first comparison signal CMP1 may be deactivated when the variation VAR is greater than the first reference value REF1.

The second comparator 263a may compare a second reference value REF2 with a first count signal CNT1 indicating the number of bits '1' in the bit stream STR to output a second comparison signal CMP2. As illustrated in FIG. 9A, when the first count signal CNT1 is less than the second reference value REF2, the second comparison signal CMP2 may be deactivated. Also, the third comparator 264a may compare the second reference value REF2 with a second count signal CNT2 indicating the number of bits '0' in the bit stream STR to output a third comparison signal CMP3. As illustrated in FIG. 9A, when the second count signal CNT2 is less than the second reference value REF2, the third comparison signal CMP3 may be deactivated.

The AND gate 265a may receive the first to third comparison signals CMP1 to CMP3 to output the result signal RES. That is, when at least one of the first to third comparison signals CMP1 to CMP3 is deactivated, the result signal RES may be deactivated, namely, may indicate that the randomness of the bit stream STR is FAIL. Therefore, when the variation VAR of the plurality of sums SUM is not greater than the first reference value REF1 and the first and second count signals CNT1 and CNT2 are greater than the second reference value REF2, the randomness of the bit stream STR may be determined as PASS. That is, when the variation VAR of the plurality of sums SUM is less than the first reference value REF1 or at least one of the first and second count signals CNT1 and CNT2 is less than the second reference value REF2, the randomness of the bit stream STR may be determined as FAIL.

Referring to FIG. 9B, the randomness determination circuit 260b may include a variation detector 261b, a plurality of comparators 262b, 263b, and 264b, and an AND gate 265b, and a second reference value generator 266b. In comparison with the randomness determination circuit 260a of FIG. 9A, in the randomness determination circuit 260b of FIG. 9B, when a first count signal CNT1 or a second count signal CNT2 is greater than a second reference value REF2', the randomness of the bit stream STR may be determined as FAIL. That is, the second reference value REF2' of FIG. 9B may be greater than the second reference value REF2 of FIG. 9A, and for example, the second reference value REF2' of FIG. 9B may match a difference between the second reference value REF2 of FIG. 9A and 'N' that is the number of bits of the bit stream STR.

Figure 10A:
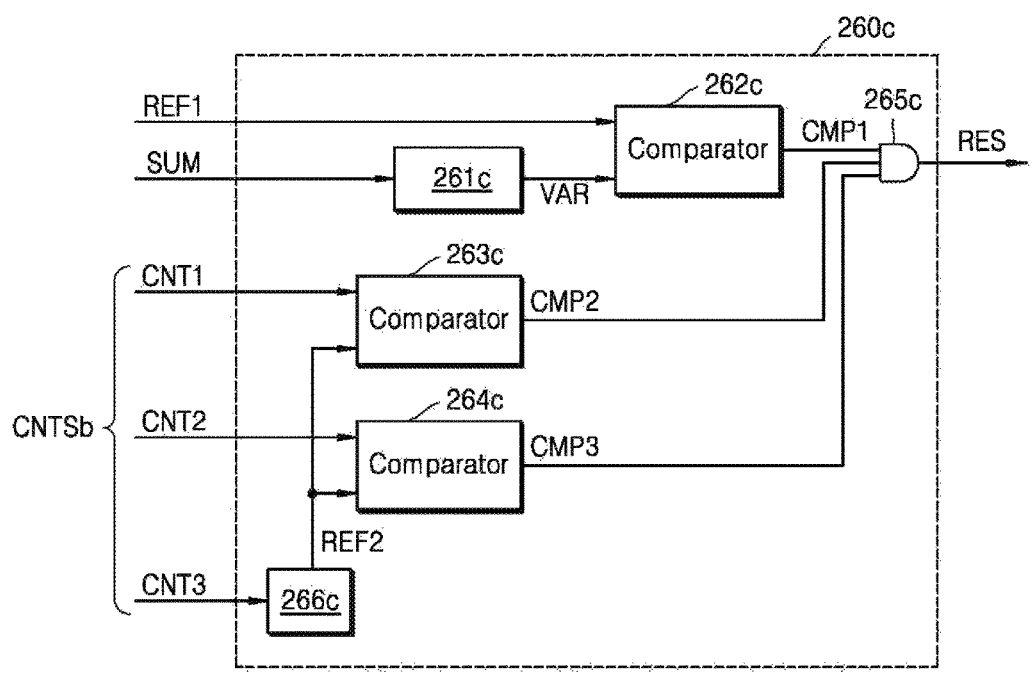
FIGS. 10A and 10B are block diagrams illustrating examples of the randomness determination circuit of FIG. 7 according to exemplary embodiments.
Figure 10B:
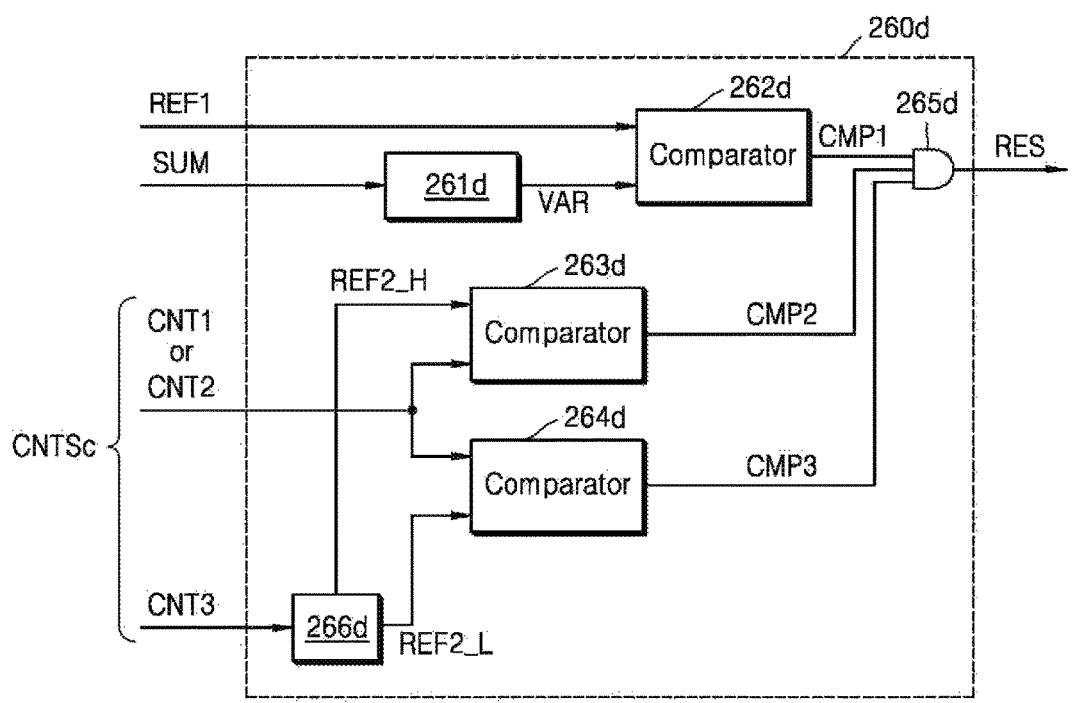

FIGS. 10A and 10B are block diagrams illustrating examples 260c and 260d of the randomness determination circuit 260 of FIG. 7 according to exemplary embodiments.

Referring to FIG. 10A, a randomness determination circuit 260c may include a variation detector 261c, a plurality of comparators 262c, 263c, and 264c, and an AND gate 265c, and a second reference value generator 266c. In comparison with the randomness determination circuit 260a of FIG. 9A and the randomness determination circuit 260b of FIG. 9B, the randomness determination circuit 260c of FIG. 10A may further include a second reference value generator 266c that generates a second reference signal REF2 based on a third count signal CNT3.

The second reference value generator 266c may generate the second reference signal REF2 based on the third count signal CNT3 indicating the number of bits of a bit stream STR, and further based on a desired ratio between the number of the bits of the bit stream STR and the number of bits having the same bit value, wherein the desired ratio is determined based on a desired entropy level for the bit stream STR. That is, the second reference value generator 266c may multiply the determined desired ratio by a value indicated by the third count signal CNT3 to generate the second reference signal REF2.

Similar to the embodiment of FIG. 9A, the second reference signal REF2 is compared with the first and second count signals CNT1 and CNT2, and when one of the first and second count signals CNT1 and CNT2 is less than the second reference value REF2, the randomness of the bit stream STR is determined as FAIL.

Referring to FIG. 10B, a randomness determination circuit 260d may include a variation detector 261d, a plurality of comparators 262d, 263d, and 264d, and an AND gate 265d, and a second reference value generator 266d. The randomness determination circuit 260d may determine whether a first count signal CNT1 or a second count signal CNT2 is within a certain range. For example, as illustrated in FIG. 10B, the second reference value generator 266d may generate two second reference values REF2_H and REF2_L, and the second comparator 263d may compare a high second reference value REF2_H with the first or second count signal CNT1 or CNT2, thereby generating a second comparison signal CMP2. Also, the third comparator 264d may compare a low second reference value REF2_L with the first or second count signal CNT1 or CNT2, thereby generating a third comparison signal CMP3. When the first or second count signal CNT1 or CNT2 is not between the second reference values REF2_H and REF2_L, at least one of the second and third comparison signals CMP2 and CMP3 may be deactivated, and thus, a result signal RES may be deactivated.

The second reference value generator 266d may generate the two second reference values REF2_H and REF2_L based on the third count signal CNT3, and further based on a desired ratio between the number of bits of the bit stream STR and the number of bits having the same bit value, wherein the desired ratio is determined based on a desired entropy level for the bit stream STR. For example, the second reference value generator 266d may multiply the determined desired ratio by a value indicated by the third count signal CNT3 to generate the low second reference value REF2_L, and may subtract the low second reference value REF2_L from a value indicated by the third count signal CNT3 to generate the high second reference value REF2_H.

Figure 11:
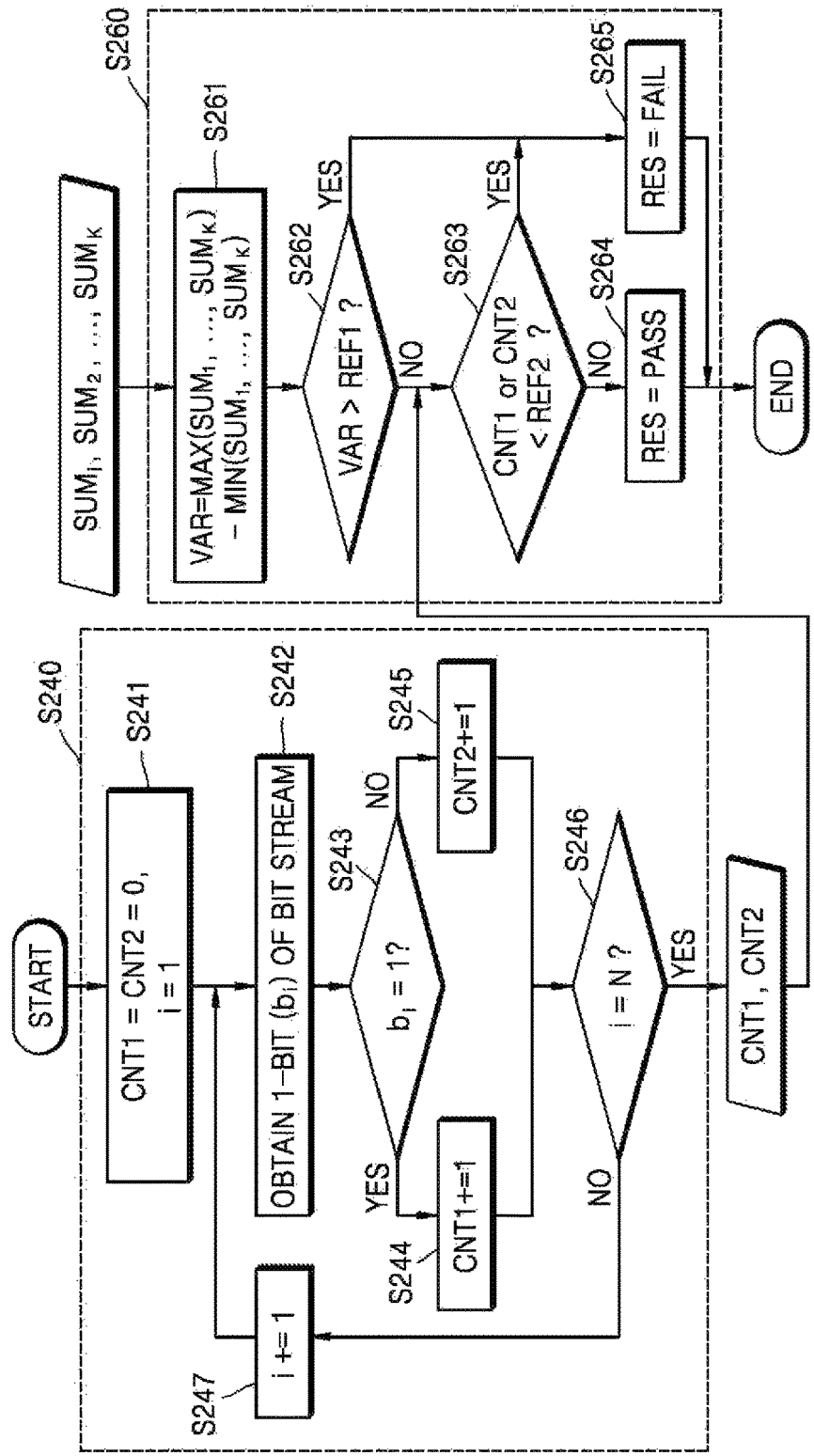
FIG. 11 is a flowchart illustrating an operation of the randomness test apparatus of FIG. 7 according to an exemplary embodiment.

FIG. 11 is a flowchart illustrating an operation of the randomness test apparatus 200 of FIG. 7 according to an exemplary embodiment.

In an exemplary embodiment, operation S240 of FIG. 11 may be performed by the mono-bit test circuit 240 of FIG. 7, and operation S260 of FIG. 11 may be performed by the randomness determination circuit 260 of FIG. 7. As illustrated in FIG. 11, operation S240 may include a plurality of operations (e.g., S241 to S247), and operation S260 may include a plurality of operations (e.g., S261 to S265).

In operation S241, an initializing operation may be performed. For example, as illustrated in FIG. 11, an operation of resetting (e.g., setting to 0) a first count signal CNT1 and a second count signal CNT2 and setting a variable 'i' to 1 may be performed.

In operation S242, an operation of obtaining a 1-bit $b_i$ of a bit stream may be performed. For example, the randomness test apparatus 200 may latch the 1-bit $b_i$ of the bit stream STR at every rising (or falling) edge of the clock signal CLK.

In operation S243, an operation of determining whether the obtained bit $b_i$ is '1' may be performed. When the obtained bit $b_i$ is '1', an operation of increasing the first count signal CNT1 by one may be performed in operation S244. On the other hand, when the obtained bit $b_i$ is not '1' (e.g., when the obtained bit $b_i$ is '0'), an operation of increasing the second count signal CNT2 by one may be performed in operation S245.

In operation S246, an operation of determining whether the variable 'i' matches 'N' may be performed. That is, whether all bits of the bit stream STR are obtained may be determined. When the variable 'i' does not match 'N' (e.g., all bits of the bit stream STR are not obtained), an operation of increasing the variable 'i' by one may be performed in operation S247, and an operation of obtaining a new 1-bit of the bit stream may be performed in operation S242. On the other hand, when the variable 'i' matches 'N' (e.g., all bits of the bit stream STR are obtained), the first count signal CNT1 and the second count signal CNT2 may be output.

Subsequently, an operation of subtracting a minimum value of K number of sums $SUM_1, SUM_2, \ldots,$ and $SUM_K$ from a maximum value of the K number of sums $SUM_1, SUM_2, \ldots,$ and $SUM_K$ may be performed in operation S261. That is, a difference between the maximum value and the minimum value of the K number of sums $SUM_1, SUM_2, \ldots,$ and $SUM_K$ may be generated as a variation VAR.

In operation S262, an operation of comparing the variation VAR with a first reference value REF1 may be performed. When the variation VAR is greater than the first reference value REF1, a result signal RES may indicate FAIL in operation S265. On the other hand, when the variation VAR is equal to or less than the first reference value REF1, an operation of comparing the first count signal CNT1 or the second count signal CNT2 with a second reference value REF2 may be performed in operation S263. When the first count signal CNT1 or the second count signal CNT2 is less than a second reference value REF2, the result signal RES may indicate FAIL in operation S265. On the other hand, when the first count signal CNT1 and the second count signal CNT2 are equal to or greater than the second reference value REF2, the result signal RES may indicate PASS in operation S264. In a case where 'N' is 2048 and the second reference value REF2 is 880, an experiment result shows that even when a probability of a bit having a value of '1' is 0.385, a probability of determining that the bit stream STR is not sufficiently random is 0.99998362.

Figure 12A:
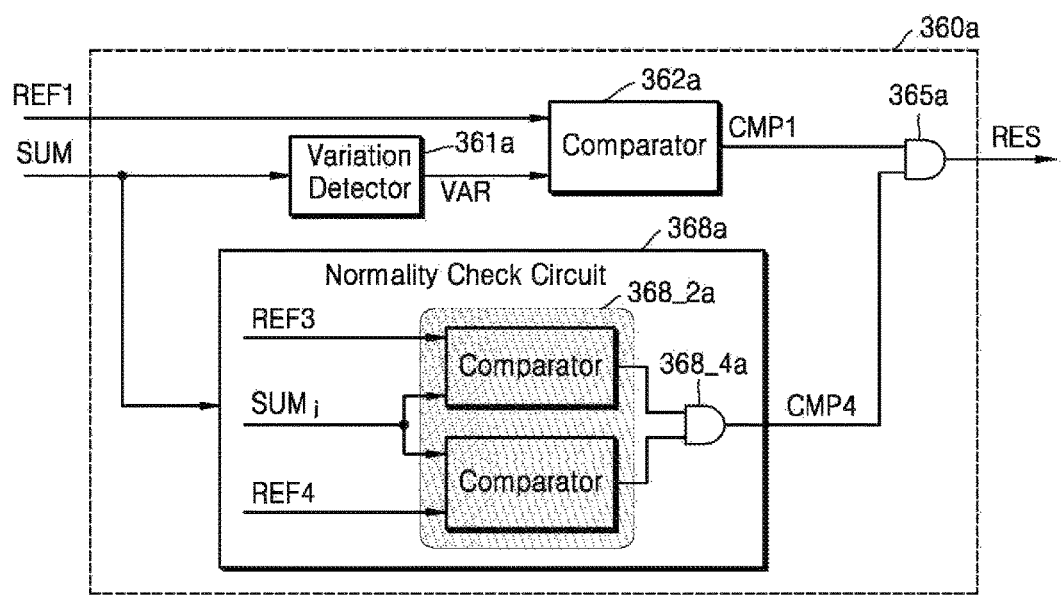
FIGS. 12A and 12B are block diagrams illustrating examples of a randomness determination circuit according to exemplary embodiments.
Figure 12B:
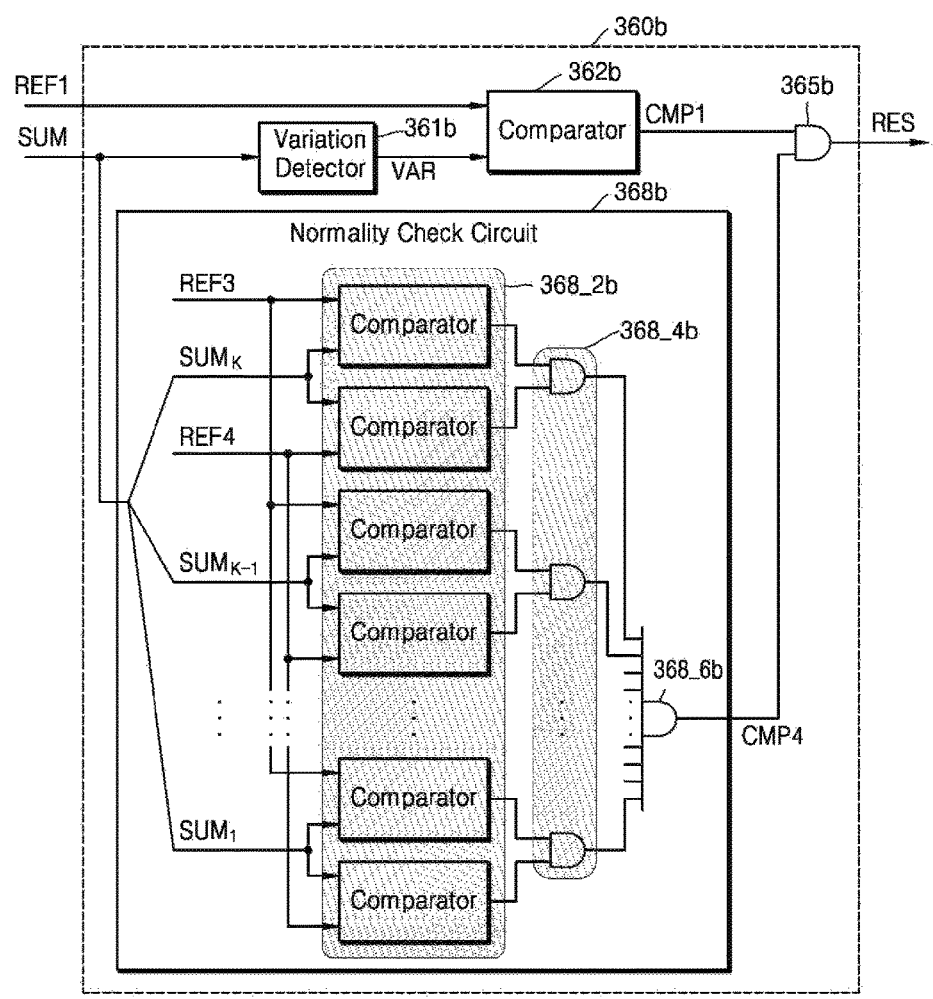

FIGS. 12A and 12B are block diagrams illustrating examples of a randomness determination circuit 360 according to exemplary embodiments.

Similarly to the randomness determination circuit 160 of FIG. 3, a randomness determination circuit 360a of FIG. 12A and a randomness determination circuit 360b of FIG. 12B may each receive K number of sums $SUM_1, SUM_2, \ldots,$ and $SUM_K$ (or SUM) to output a result signal RES. Hereinafter, repetitive description of the structures and operations similar to or the same as those described above is omitted.

Referring to FIG. 12A, the randomness determination circuit 360a may include a variation detector 361a, a first comparator 362a, an AND gate 365a, and a normality check circuit 368a.

Similarly to the variation detector 161 of FIG. 5, the variation detector 361a may detect a variation of the K number of sums $SUM_1$, $SUM_2$, ..., and $SUM_K$ (or SUM) to output a variation VAR. The first comparator 362a may compare a first reference value REF1 with the variation VAR to output a first comparison signal CMP1.

The normality check circuit 368a may determine whether an arbitrary sum $SUM_j$ ($1 \le j \le K$) of the K number of sums $SUM_1$, $SUM_2$, ..., and $SUM_K$ (or SUM) is within a certain range. That is, the normality check circuit 368a may determine whether the arbitrary sum $SUM_j$ of the K number of sums $SUM_1$, $SUM_2$, ..., and $SUM_K$ (or SUM) is between a third reference value REF3 and a fourth reference value REF4.

As illustrated in FIG. 12A, the normality check circuit 368a may include two comparators 368_2a and an AND gate 368_4a. The sum $SUM_j$ may be input to each of the two comparators 368_2a and may be compared with the third reference value REF3 and the fourth reference value REF4. The AND gate 368_4a may perform an AND operation on output signals of the comparators 368_2a. Accordingly, when the sum $SUM_j$ is between the third reference value REF3 and the fourth reference value REF4, a fourth comparison signal CMP4 output from the AND gate 368_4a may be activated, and otherwise, the fourth comparison signal CMP4 may be deactivated. For example, as a desired entropy in the bit stream STR becomes higher, a difference between the third reference value REF3 and the fourth reference value REF4 may be reduced.

When at least one of the first comparison signal CMP1 and the fourth comparison signal CMP4 is deactivated, the result signal RES may be deactivated. That is, when the variation of the K number of sums $SUM_1$, $SUM_2$, ..., and $SUM_K$ (or SUM) is less than the first reference value REF1 and the arbitrary sum $SUM_j$ of the K number of sums $SUM_1$, $SUM_2$, ..., and $SUM_K$ (or SUM) is between the third reference value REF3 and the fourth reference value REF4, the result signal RES may be activated. Therefore, the randomness determination circuit 360 may check a randomness of the bit stream STR, based on a value of arbitrary sum $SUM_j$ of the K number of sums $SUM_1$, $SUM_2$, ..., and $SUM_K$ (or SUM) as well as the variation of the K number of sums $SUM_1$, $SUM_2$, ..., and $SUM_K$ (or SUM).

Referring to FIG. 12B, similarly to the randomness determination circuit 360a of FIG. 12A, the randomness determination circuit 360b may include a variation detector 361b, a first comparator 362b, an AND gate 365b, and a normality check circuit 368b. In comparison with the normality check circuit 368a of FIG. 12A, the normality check circuit 368b of FIG. 12B may determine whether each of the K number of sums $SUM_1$, $SUM_2$, ..., and $SUM_K$ (or SUM) is within a certain range. That is, the normality check circuit 368b may determine whether each of the K number of sums $SUM_1$, $SUM_2$, ..., and $SUM_K$ (or SUM) is between a third reference value REF3 and a fourth reference value REF4.

As illustrated in FIG. 12B, the normality check circuit 368b may include a plurality of comparators 368_2b and a plurality of AND gates 368_4b and 368_6b. Each of the K number of sums $SUM_1$, $SUM_2$, ..., and $SUM_K$ (or SUM) may be input to each pair of the comparators 368_2b and may be compared with the third reference value REF3 and the fourth reference value REF4. The AND gates 368_4b and 368_6b may each perform an AND operation on output signals of the comparators 368_2b. Accordingly, when each of the K number of sums $SUM_1$, $SUM_2$, ..., and $SUM_K$ (or SUM) is between the third reference value REF3 and the fourth reference value REF4, a fourth comparison signal CMP4 output from the AND gate 368_6b may be activated, and otherwise, the fourth comparison signal CMP4 may be deactivated.

Figure 13A:
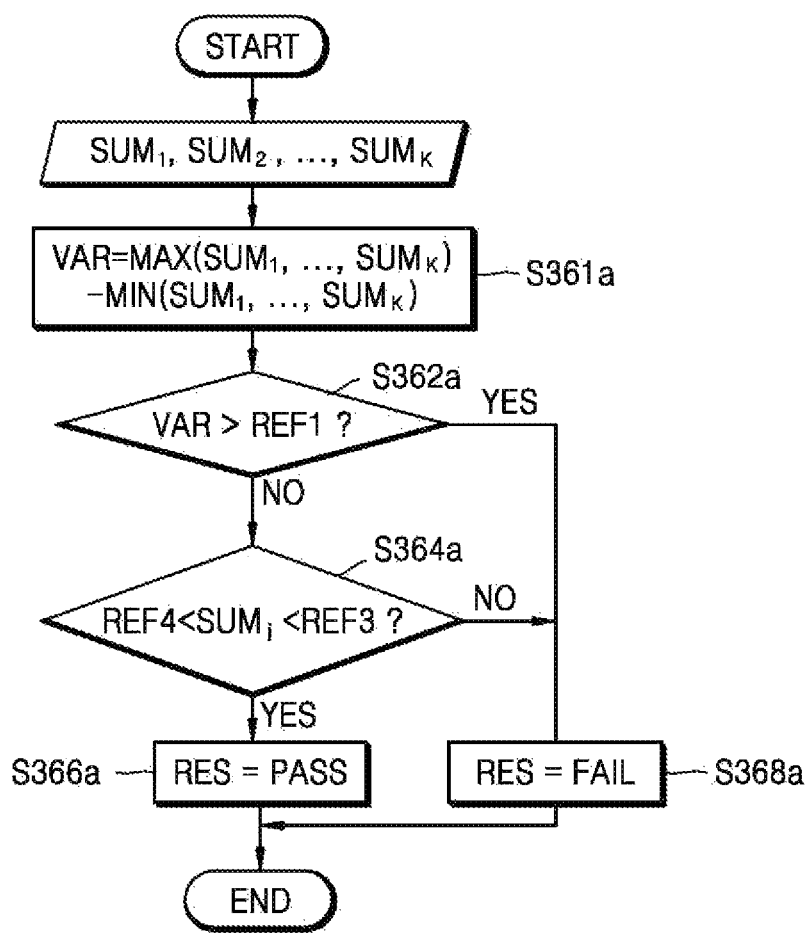
FIGS. 13A and 13B are flowcharts illustrating examples of operations of the randomness determination circuits of FIGS. 12A and 12B according to exemplary embodiments.
Figure 13B:
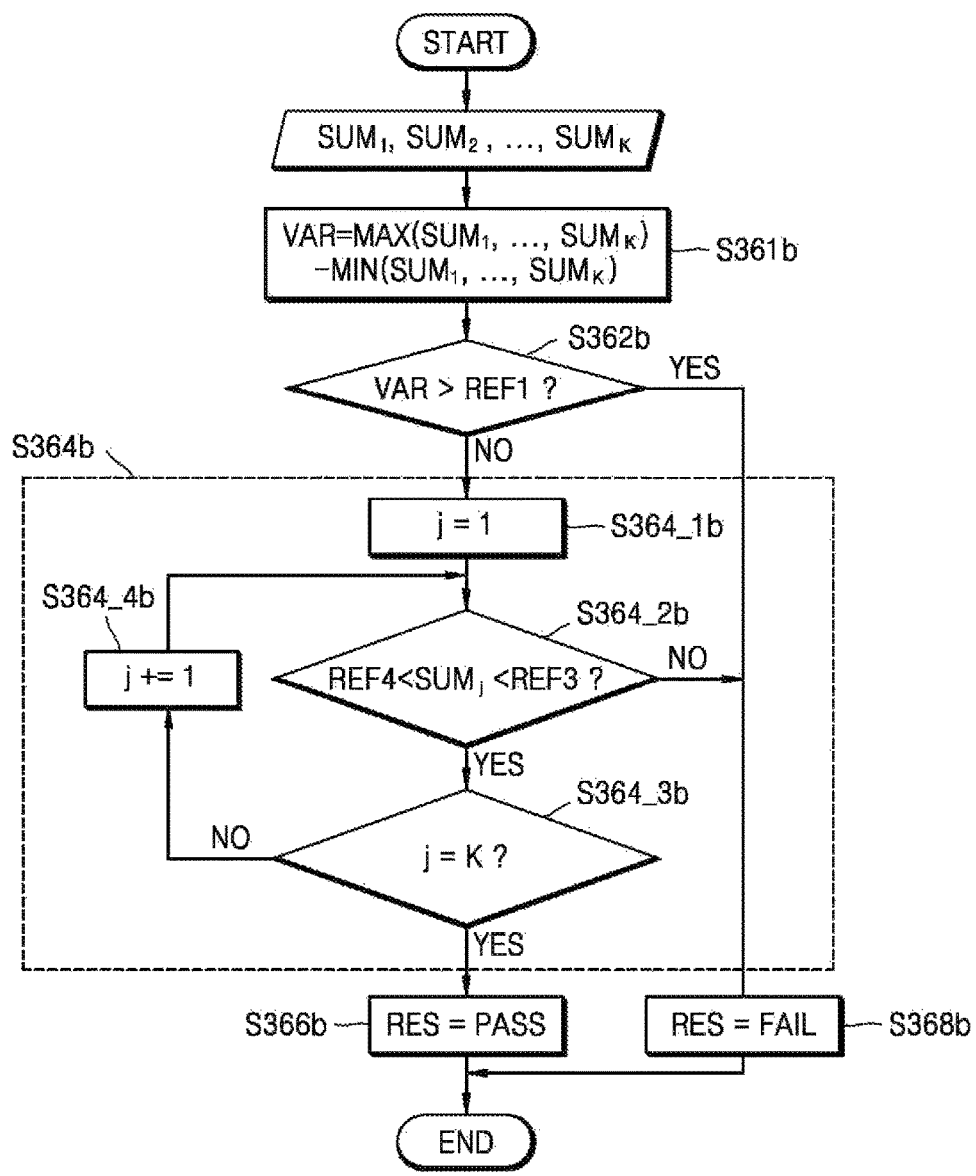

FIGS. 13A and 13B are flowcharts illustrating examples of operations of the randomness determination circuits of FIGS. 12A and 12B according to exemplary embodiments.

In an exemplary embodiment, operation S364a of FIG. 13A may be performed by the normality check circuit 368a of FIG. 12A, and operation S364b of FIG. 13B may be performed by the normality check circuit 368b of FIG. 12B.

Referring to FIG. 13A, in operation S361a, an operation of subtracting a minimum value of K number of sums $SUM_1$, $SUM_2$, ..., and $SUM_K$ from a maximum value of the K number of sums $SUM_1$, $SUM_2$, ..., and $SUM_K$ may be performed. That is, a difference between the maximum value and the minimum value of the K number of sums $SUM_1$, $SUM_2$, ..., and $SUM_K$ may be generated as a variation VAR.

In operation S362a, an operation of comparing the variation VAR with a first reference value REF1 may be performed. When the variation VAR is greater than the first reference value REF1, a result signal RES may indicate FAIL in operation S368a. On the other hand, when the variation VAR is equal to or less than the first reference value REF1, an operation of determining a range of an arbitrary sum $SUM_j$ of the K number of sums $SUM_1$, $SUM_2$, ..., and $SUM_K$ may be performed in operation S364a. When the arbitrary sum $SUM_j$ is not between a third reference value REF3 and a fourth reference value REF4, the result signal RES may indicate FAIL in operation S368a. On the other hand, when the arbitrary sum $SUM_j$ is between the third reference value REF3 and the fourth reference value REF4, the result signal RES may indicate PASS in operation S366a.

Referring to FIG. 13B, similarly to operations S361a and S362a of FIG. 13A, a difference between a maximum value and a minimum value of K number of sums $SUM_1$, $SUM_2$, ..., and $SUM_K$ may be generated as a variation VAR in operation S361b, and an operation of comparing the variation VAR with a first reference value REF1 may be performed in operation S362b.

In operation S364b, an operation of determining a range of each of the K number of sums $SUM_1$, $SUM_2$, ..., and $SUM_K$ may be performed.

In operation S364_1b, an operation of setting a variable 'j' to 1 may be performed as an initializing operation. In operation S364_2b, an operation of determining whether a j-th sum $SUM_j$ of the K number of sums $SUM_1$, $SUM_2$, ..., and $SUM_K$ is between a third reference value REF3 and a fourth reference value REF4. When the jth sum $SUM_j$ is not between the third reference value REF3 and the fourth reference value REF4, the result signal RES may indicate FAIL in operation S368b. On the other hand, when the jth sum $SUM_j$ is between the third reference value REF3 and the fourth reference value REF4, an operation of determining whether the variable 'j' matches 'K' may be performed in operation S364_3b. That is, whether an operation of determining a range on all of the K number of sums $SUM_1$, $SUM_2$, ..., and $SUM_K$ is completed may be performed. When the variable 'j' does not match 'K' (e.g., an operation of determining a range is not performed on all of the K number of sums $SUM_1$, $SUM_2$, ..., and $SUM_K$), an operation of increasing the variable 'j' by one may be performed in operation S364_4b, and an operation of determining whether the jth sum $SUM_j$ of the K number of sums $SUM_1$, $SUM_2$, ..., and $SUM_K$ is between the third reference value REF3 and the fourth reference value REF4 may be performed in operation S364_2*b*. On the other hand, when the variable 'j' matches 'K' (e.g., the operation of determining the range is performed on all of the K number of sums $SUM_1$, $SUM_2$, . . . , and $SUM_K$), the result signal RES may indicate PASS in operation S366*b*.

Figure 14:
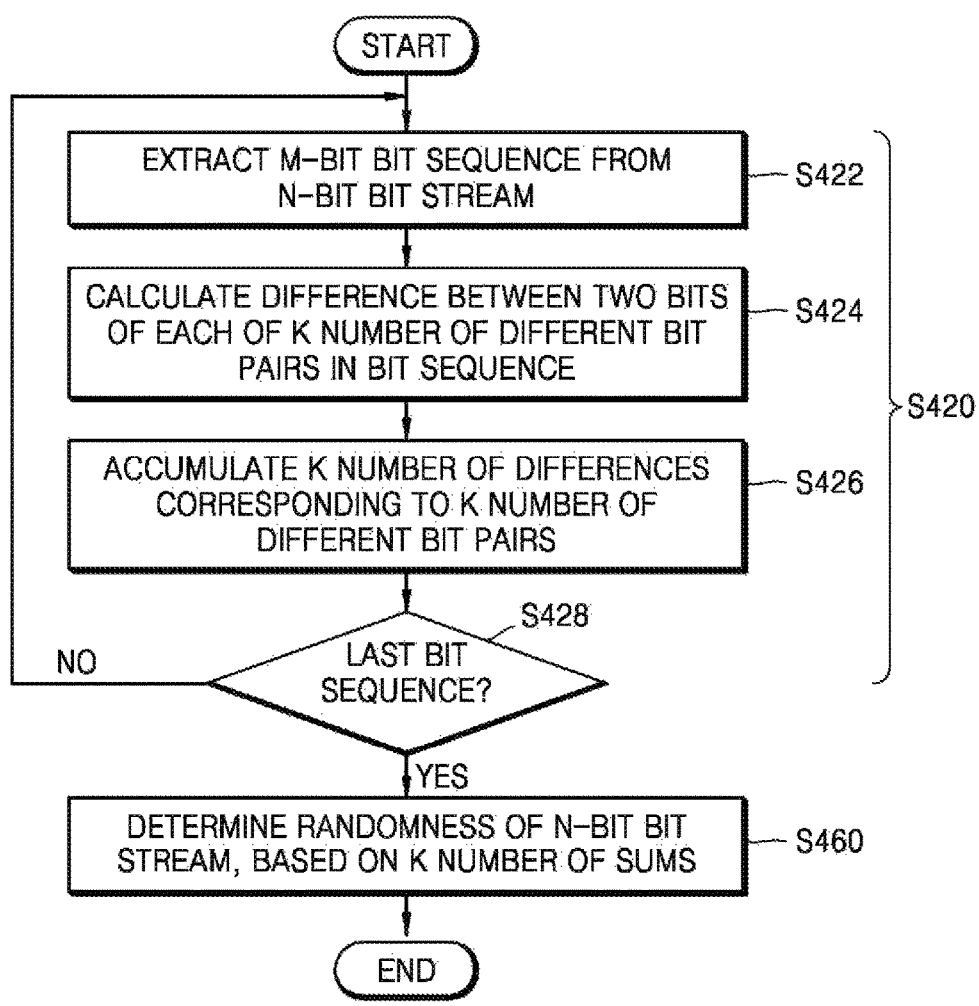
FIG. 14 is a flowchart illustrating a randomness test method for a random number generator according to an exemplary embodiment.

FIG. 14 is a flowchart illustrating a randomness test method for a random number generator according to an exemplary embodiment.

As illustrated in FIG. 14, the randomness test method may include a plurality of operations (S420 and S460). For example, operation S420 including a plurality of operations (e.g., S422, S424, S426, and S428) may be performed by the correlation test circuit 120 of FIG. 3, and operation S460 may be performed by the randomness determination circuit 160 of FIG. 3. Hereinafter, FIG. 14 will be described with reference to FIG. 3.

In operation S422, an operation of extracting an M-bit bit sequence from an N-bit bit stream may be performed. For example, the bit sequence may include M number of continuous bits. Similarly to an operation of the shift register 122 of FIG. 3, an LSB of a previously extracted bit sequence may be removed, and by adding a new bit from the bit stream as an MSB, a new bit sequence may be extracted.

In operation S424, an operation of calculating a difference between two bits of each of K number of different bit pairs in the bit sequence may be performed. The K different bit pairs may have different widths, and a difference between two bits of each of the bit pairs may be calculated by performing, for example, an XOR operation on the two bits. A width of a bit pair may denote a distance between two bits of the bit pair.

In operation S426, an operation of accumulating K number of differences corresponding to the K different bit pairs may be performed. That is, differences corresponding to bit pairs having the same bit width may be accumulated, and thus, K number of accumulated sums may be updated in operation S426.

In operation S428, an operation of determining whether the bit sequence is a last bit sequence may be performed. In operation S422, 'N−M+1' number of different M-bit bit sequences may be extracted from the N-bit bit stream. Therefore, whether the bit sequence which is extracted in operation S422 is an (N−M+1)-th bit sequence may be determined, and when the bit sequence is the (N−M+1)-th bit sequence, the bit sequence may be determined as a last bit sequence. When the extracted bit sequence is not the last bit sequence, an operation of extracting a new bit sequence from the bit stream may be performed in operation S422. On the other hand, when the extracted bit sequence is the last bit sequence, operation S460 may be performed.

In operation S460, an operation of determining a randomness of the N-bit bit stream based on the K accumulated differences may be performed. Since differences corresponding to a first bit sequence to the last bit sequence are accumulated in operation S426, an operation of determining a randomness of the N-bit bit stream based on the updated K number of sums may be performed. For example, as described above with reference to FIG. 6, a difference (e.g., a variation of the K number of sums) between a maximum value and a minimum value of the K number of sums may be detected, and the randomness of the N-bit bit stream may be determined based on the detected variation. That is, when the detected variation of the K number of sums is greater than a certain value (for example, a first reference value), the N-bit bit stream may be determined as not being sufficiently random, and otherwise, the N-bit bit stream may be determined as being sufficiently random. Also, as described above with reference to FIGS. 13A and 13B, whether at least one of the K number of sums is within a certain range (for example, between a third reference value and a fourth reference value) may be tested. When the at least one sum is outside the certain range as a result of the test, the N-bit bit stream may be determined as not being sufficiently random, and otherwise, the N-bit bit stream may be determined as being sufficiently random.

Figure 15:
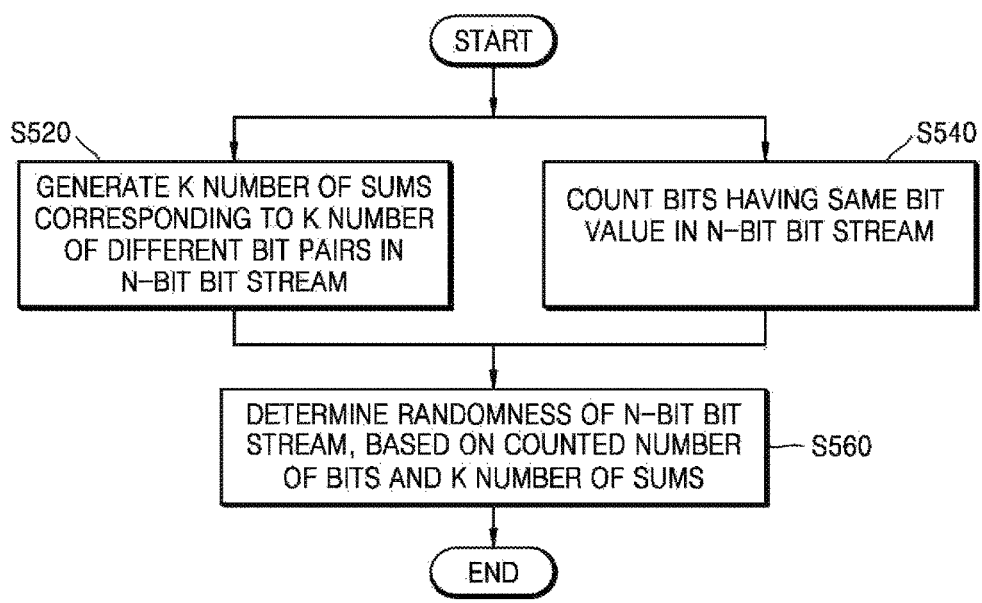
FIG. 15 is a flowchart illustrating a randomness test method for a random number generator according to an exemplary embodiment.

FIG. 15 is a flowchart illustrating a randomness test method for a random number generator according to an exemplary embodiment.

In comparison with the randomness test method of FIG. 14, the randomness test method of FIG. 15 may additionally use the number of bits having the same bit value in a bit stream. As illustrated in FIG. 15, the randomness test method may include a plurality of operations (e.g., S520, S540, and S560). For example, operation S520 may be performed by the correlation test circuit 220 of FIG. 7, operation S540 may be performed by the mono-bit test circuit 240 of FIG. 7, and operation S560 may be performed by the randomness determination circuit 260 of FIG. 7.

In operation S520, an operation of generating K number of sums corresponding to K number of different bit pairs in an N-bit bit stream may be performed. For example, similarly to operation S420 of FIG. 14, K number of differences may be calculated from each of a plurality of bit sequences extracted from the N-bit bit stream, and the K number of sums may be generated by accumulating each of the K differences for the plurality of bit sequences.

In operation S540, an operation of counting bits having the same bit value in the N-bit bit stream may be performed. For example, as described above with reference to FIG. 11, bits having a value of '1' in the N-bit bit stream may be counted, and/or bits having a value of '0' may be counted.

In operation S560, an operation of determining a randomness of the N-bit bit stream based on the number of the counted bits and the K number of sums may be performed. For example, as described above with reference to FIG. 11, when the number of the counted bits having a value of '1' or the number of the counted bits '0' is less than a certain number (for example, a second reference value), the N-bit bit stream may be determined as not being sufficiently random. Also, a difference (e.g., a variation of the K number of sums) between a maximum value and a minimum value of the K number of sums may be detected, and when the detected variation is greater than a certain value (for example, the first reference value), the N-bit bit stream may be determined as not being sufficiently random.

Figure 16:
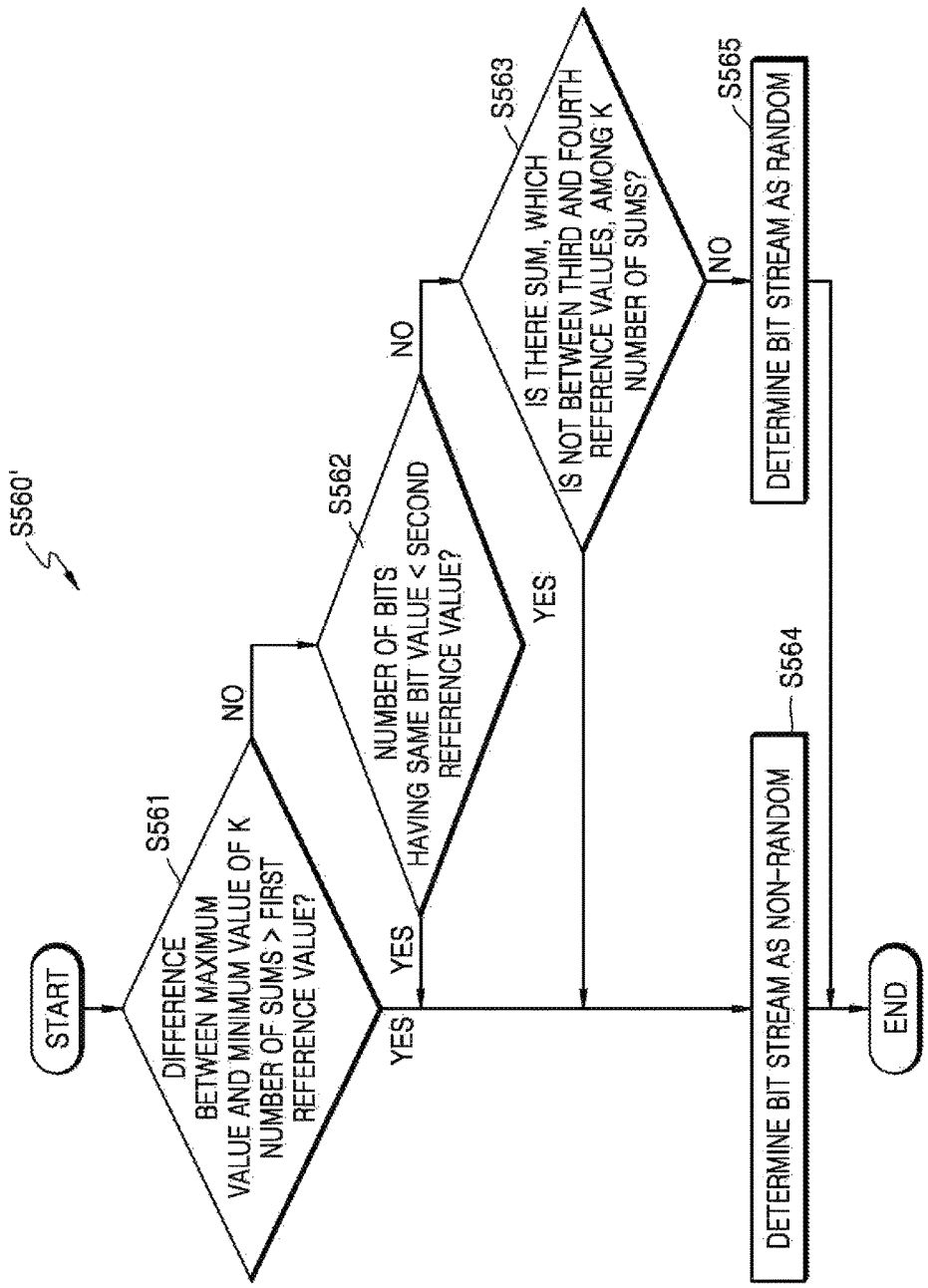
FIG. 16 is a flowchart illustrating an example of operation S560 of FIG. 15 according to an exemplary embodiment.

FIG. 16 is a flowchart illustrating an example of operation S560 of FIG. 15 according to an exemplary embodiment.

As described above with reference to FIG. 15, an operation of determining a randomness of an N-bit bit stream based on the number of counted bits and K number of sums may be performed in operation S560'. As illustrated in FIG. 16, operation S560' may include a plurality of operations (e.g., S561 to S565).

In operation S561, an operation of determining whether a difference between a maximum value and a minimum value of the K number of sums is greater than a first reference value may be performed. When the difference between the maximum value and the minimum value of the K number of sums is greater than the first reference value, an operation of determining the bit stream as not being sufficiently random may be performed in operation S564. For example, as described above with reference to FIGS. 6, 11, 13A, and 13B, a variation of the K number of sums may be detected by extracting the maximum value and the minimum value of the K number of sums, and when the variation of the K number of sums is greater than the first reference value, the bit stream may be determined as not being sufficiently random, based on a low entropy level of the bit stream. On the other hand, when the difference between the maximum value and the minimum value of the K number of sums is not greater than the first reference value, operation S562 may be performed.

In operation S562, an operation of determining whether the number of bits having the same bit value is less than a second reference value may be performed. When the number of the bits having the same bit value is less than the second reference value, an operation of determining the bit stream as non-random (or not being sufficiently) may be performed in operation S564. For example, as described above with reference to FIG. 11, the number of bits having the same bit value in the bit stream may be counted, and when the counted number of the bits is less than the second reference value, the bit stream may be determined as non-random, based on a low entropy level of the bit stream. On the other hand, when the number of bits having the same bit value is not less than the second reference value, operation S563 may be performed.

In operation S563, an operation of determining whether there is a sum, which is not between a third reference value and a fourth reference value, among the K number of sums may be performed. When there is a sum, which is not between the third reference value and the fourth reference value, among the K number of sums, an operation of determining the bit stream as non-random (or not being sufficiently random) may be performed in operation S564. For example, as described above with reference to FIGS. 13A and 13B, at least one of the K number of sums may be compared with the third reference value and the fourth reference value, and when at least one sum is not between the third reference value and the fourth reference value, the bit stream may be determined as non-random not being sufficiently, based on a low entropy level of the bit stream. On the other hand, when all of the K number of sums are between the third reference value and the fourth reference value, an operation of determining the bit stream as random (or being sufficiently random) may be performed in operation S565.

FIG. 16 illustrates three operations S561, S562, and S563 of testing whether a bit stream is random, but according to an exemplary embodiment, it may be understood that operation S560 of FIG. 5 may include only at least one of the three operations S561, S562, and S563. Also, in FIG. 16, an order in which the three operations S561, S562, and S563 are performed is merely an example, and it may be understood that the three operations S561, S562, and S563 may be performed in an order different from an order illustrated in FIG. 16.

Although a few embodiments have been shown and described, it would be appreciated by those skilled in the art that changes may be made in example embodiments without departing from the principles and spirit of the disclosure, the scope of which is defined in the claims and their equivalents.

What is claimed is:

1. An apparatus for testing a random number generator, the apparatus comprising:
    a correlation test circuit configured to extract a first plurality of bit pairs each including two bits spaced apart from each other by a first distance in a bit stream generated by the random number generator, extract a second plurality of bit pairs each including two bits spaced apart from each other by a second distance, different from the first distance, in the bit stream, obtain a first sum of differences between respective two bits of the first plurality of bit pairs, and obtain a second sum of differences between respective two bits of the second plurality of bit pairs; and
    a randomness determination circuit configured to determine a randomness of the bit stream, based on the first sum and the second sum.

2. The apparatus of claim 1, wherein the first sum and the second sum are comprised in a plurality of sums corresponding to a plurality of different distances between two bits in the bit stream, and
    wherein the randomness determination circuit is configured to determine the randomness of the bit stream, based on a difference between a maximum value and a minimum value of the plurality of sums.

3. The apparatus of claim 2, wherein, in response to the difference between the maximum value and the minimum value being greater than a first reference value, the randomness determination circuit is configured to determine the bit stream as not being random.

4. The apparatus of claim 1, wherein the correlation test circuit is configured to perform an XOR operation on two bits of each of the first plurality of bit pairs or two bits of the second plurality of bit pairs to obtain a difference between the two bits.

5. The apparatus of claim 1, further comprising:
    a mono-bit test circuit configured to generate a count output by counting a number of bits having the same bit value in the bit stream,
    wherein the randomness determination circuit is configured to determine the randomness of the bit stream, further based on the count output.

6. The apparatus of claim 5, wherein, in response to the count output being less than a second reference value, the randomness determination circuit is configured to determine the bit stream as not being random.

7. The apparatus of claim 5, wherein the mono-bit test circuit is configured to generate the count output including at least one of a number of bits having a bit value of '0' and a number of bits having a bit value of '1'.

8. The apparatus of claim 1, wherein the randomness determination circuit is configured to compare at least one sum among the first sum and the second sum with each of a third reference value and a fourth reference value, and in response to the at least one sum being not between the third reference value and the fourth reference value, the randomness determination circuit is configured to determine the bit stream as not being random.

9. An apparatus for testing a random number generator, the apparatus comprising:
    an M-bit shift register configured to sequentially receive N-bits generated by the random number generator;
    a difference operation circuit configured to obtain a difference between two bits of each of K number of different bit pairs in an M-bit sequence output from the M-bit shift register;
    K number of accumulators respectively connected to bits of a K-bit output of the difference operation circuit; and
    a randomness determination circuit configured to determine a randomness of the N-bits, based on outputs of the K number of accumulators,
    wherein each of 'K', 'M', and 'N' is an integer equal to or greater than two.

10. The apparatus of claim 9, wherein the randomness determination circuit is configured to determine the randomness of the N-bits, based on a difference between a maximum value and a minimum value of the outputs of the K number of accumulators.

11. The apparatus of claim 10, wherein, in response to the difference between the maximum value and the minimum value being greater than a first reference value, the randomness determination circuit is configured to determine the N-bits as not being random.

12. The apparatus of claim 9, wherein the difference operation circuit comprises K number of XOR gates respectively configured to receive each of the K number of different bit pairs to generate the K-bit output.

13. The apparatus of claim 9, wherein the K number of accumulators are configured to accumulate, 'N−M+1' times, each of the bits of the K-bit output of the difference operation circuit.

14. The apparatus of claim 9, further comprising:
a counter circuit configured to count a number of bits having the same bit value among the N-bits,
wherein the randomness determination circuit is configured to determine the randomness of the N-bits, further based on an output of the counter circuit.

15. The apparatus of claim 9, wherein the randomness determination circuit is configured to compare at least one output among the outputs of the K number of accumulators with each of a third reference value and a fourth reference value, and in response to the at least one output being not between the third reference value and the fourth reference value, the randomness determination circuit is configured to determine the N-bits as not being random.

16. An apparatus for controlling a random number generator, the apparatus comprising:
the random number generator configured to generate a bit stream;
a randomness test apparatus configured to obtain a difference between bit values of two bits of each of a first plurality of bit pairs having different widths in a bit sequence included in the bit stream, obtain accumulated differences corresponding to the different widths in a plurality of different bit sequences obtained by shifting the bit stream, and configured to generate an output signal based on a variation in the accumulated differences; and
a controller configured to control the random number generator based on the output signal of the randomness test apparatus.

17. The apparatus of claim 16, wherein the controller is configured to perform at least one of initializing, restarting, and stopping an operation of the random number generator based on the output signal of the randomness test apparatus.

18. The apparatus of claim 16, wherein the randomness test apparatus configured to obtain each of the accumulated differences corresponding to the same width, among the different widths, based on a second plurality of bit pairs having the same width in the plurality of different bit sequences.

19. The apparatus of claim 18, wherein the randomness test apparatus is configured to compare the variation with a reference value to generate the output signal based on a result of comparison.

20. The apparatus of claim 19, wherein the controller is configured to generate a setting signal based on a desired entropy of the bit stream and provide the setting signal to the randomness test apparatus, and
wherein the reference value is generated based on the setting signal.

* * * * *